(12) United States Patent
Fiducci

(10) Patent No.: US 9,348,838 B2
(45) Date of Patent: *May 24, 2016

(54) DATA BACKUP, STORAGE, TRANSFER AND RETRIEVAL SYSTEM, METHOD AND COMPUTER PROGRAM PRODUCT

(71) Applicant: Thomas E. Fiducci, Chicago, IL (US)

(72) Inventor: Thomas E. Fiducci, Chicago, IL (US)

(73) Assignee: JUSTSERVICE.NET LLC, Chicago, IL (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/782,250

(22) Filed: Mar. 1, 2013

(65) Prior Publication Data
US 2013/0179469 A1     Jul. 11, 2013

Related U.S. Application Data

(63) Continuation of application No. 13/460,107, filed on Apr. 30, 2012, now Pat. No. 8,392,542, which is a continuation of application No. 12/961,114, filed on Dec. 6, 2010, now Pat. No. 8,195,776, which is a continuation of application No. 11/879,997, filed on Jul. 18, 2007, now Pat. No. 7,849,165, which is a continuation-in-part of application No. 11/408,728, filed on Apr. 21, 2006, now Pat. No. 8,126,990.

(60) Provisional application No. 60/673,751, filed on Apr. 21, 2005.

(51) Int. Cl.
| | | |
|---|---|---|
| *G06F 15/177* | (2006.01) | |
| *G06F 17/30* | (2006.01) | |
| *H04L 29/06* | (2006.01) | |

(52) U.S. Cl.
CPC ........ *G06F 17/30194* (2013.01); *H04L 63/083* (2013.01)

(58) Field of Classification Search
CPC .................................................. H04L 2763/101
USPC ......................................................... 709/220
See application file for complete search history.

(56) References Cited

U.S. PATENT DOCUMENTS

| | | | |
|---|---|---|---|
| 6,351,776 | B1 | 2/2002 | O'Brien et al. |
| 6,571,245 | B2 * | 5/2003 | Huang et al. |
| 6,704,873 | B1 * | 3/2004 | Underwood ................... 726/12 |
| 6,714,968 | B1 | 3/2004 | Prust |
| 6,735,623 | B1 | 5/2004 | Prust |
| 6,952,724 | B2 | 10/2005 | Prust |

(Continued)

OTHER PUBLICATIONS

A.B. Cryer, Internet Virtual Storage, 2004, <www.cryer.co.uk/resources/virtualstorage.htm> accessed on Jul. 22, 2004.

(Continued)

*Primary Examiner* — Wing F Chan
*Assistant Examiner* — Andrew Woo
(74) *Attorney, Agent, or Firm* — Husch Blackwell LLP

(57) ABSTRACT

A data storage system including a virtual server on a network managing a plurality of user accounts, each user account including one or more files; the virtual server adapted to verify user access information for a particular user account; the virtual server transferring over the network information relating to files stored on the virtual server in the particular user account to a verified user on a user computer; the virtual server further adapted to transfer files associated with the particular user account to and from the user computer.

18 Claims, 25 Drawing Sheets

(56) References Cited

U.S. PATENT DOCUMENTS

| | | | |
|---|---|---|---|
| 7,181,445 B2 | 2/2007 | Bebo et al. | |
| 7,814,536 B2 | 10/2010 | Martherus et al. | |
| 2002/0194205 A1 | 12/2002 | Brown et al. | |
| 2004/0153830 A1 | 8/2004 | Cebula et al. | |
| 2004/0210644 A1 | 10/2004 | Prust | |
| 2004/0230669 A1 | 11/2004 | Teh | |
| 2005/0021613 A1* | 1/2005 | Schmeidler et al. | 709/203 |
| 2005/0097440 A1 | 5/2005 | Lusk et al. | |
| 2006/0133414 A1 | 6/2006 | Luoma et al. | |
| 2006/0242273 A1 | 10/2006 | Fiducci | |
| 2008/0028050 A1 | 1/2008 | Fiducci | |
| 2008/0295156 A1 | 11/2008 | Kitada et al. | |

OTHER PUBLICATIONS

Doneasy. Carpefore, Inc. Launches its First Service Website, doneasy.com. 2000-2003 <http://www.doneasy.com/about/press.php> accessed on Jun. 24, 2004.

Doneasy. Services. 2000-2003—<http://www.doneasy.com/services/services.php?cmd=file> accessed on Aug. 20, 2004.

Email addresses.com Calendars, To-Do Lists and PIMS. <www.emailaddresses.com/email_pim.htm> accessed on Jun. 21, 2004.

info@ZNAIL.com ZNAIL "for easier living in a virtual world." 1998-2004 <http://znail.com> accessed on Jun. 22, 2004.

Infone LLC. Infone Contacts and Calendars. 2002-2004 <www.infone.com/info.xwt?view-contact.calendar> accessed on Jun. 21, 2004.

Norton e-zine. Work the Web: Online File Storage. <http://www.glencoe.com/norton/online/ezine/display_article.phtml?id=233> accessed on Jun. 21, 2004.

Yahoo Media Relations. Yahoo! Calendar Introduces Time Guides. 2001 <http://docs.yahoo.com/docs/pr/release397.html> accessed on Jun. 24, 2004.

Yahoo Media Relations. Yahoo! Briefcase is the One Place on the Internet to Keep Photos, Documents and Other Files. 2001 <http://docs.yahoo.com/docs/pr/release352.html> accessed on Oct. 6, 2009.

* cited by examiner

DATA BACKUP, STORAGE, TRANSFER AND RETRIEVAL SYSTEM, METHOD AND COMPUTER PROGRAM PRODUCT

CROSS-REFERENCE

This application is a continuation application of U.S. application Ser. No. 13/460,107, filed Apr. 30, 2012 and set to issue on Mar. 3, 2013, which is a continuation of U.S. application Ser. No. 12/961,114, filed Dec. 6, 2010 and issued on Jun. 5, 2012, which is a continuation of U.S. application Ser. No. 11/879,997, filed Jul. 18, 2007 and issued Dec. 7, 2010, which is a continuation-in-part of application Ser. No. 11/408,728, filed Apr. 21, 2006 and issued on Feb. 28, 2012, which claims priority from U.S. Provisional Patent Application No. 60/673,751 filed Apr. 21, 2005.

FIELD OF THE INVENTION

The subject application relates to a system, method and computer program product for computer data backup, storage, retrieval, appointment scheduling, automatic reminder generating, and third-party data transfer. It is not intended that all of the foregoing objects of the invention are addressed in any one embodiment of the invention, it only being intended that one or more objects of the invention be addressed in each embodiment.

BACKGROUND OF THE INVENTION

With the increasing complexity of today's software and the proliferation of computer viruses, spyware and malware, computer crashes are not an uncommon occurrence. When a user's computer suffers a catastrophic crash, the computer may not restart properly or the user may discover that his hard drive has been damaged or erased. Such permanent damage to a user's files is particularly common where virus or malicious software is involved. When such damage occurs, the data on the user's computer will be lost, unless the user has previously saved the files on other storage media other than the local computer's hard drive.

Data can also be lost due to physical damage of the computer or computer data storage device. Portable computers, including notebook computers, hand held computes such as personal data assistants ("PDA") and mobile telephones are particularly vulnerable to physical damage as well as theft. Often loss of the data is more significant than the loss or damage to the hardware. Accordingly, data storage and retrieval is important.

Conventional file backup and storage systems typically involve hardware and software that copies all files on a computer. The entire drive—including large programs, hidden files, and other extraneous data—is typically copied, compressed and then either stored on local storage media, such as an attached disk or a special partition of the user's computer hard drive. This process is time-consuming and typically must be done when the user is not already using the computer as the conventional backup process will be interrupted when the backup system attempts to copy a system file that is in use. Further, restoring a computer from a back-up is a tedious and lengthy process. The difficulty of this process is especially problematic if the user needs immediate access to data that was only saved on his damaged computer.

A user may need to access data on a home or office computer when away from his home or office. While a number of programs currently exist enabling a user to access data on a remote computer from a second computer, these programs typically require the installation of special software on both computers to operate and requires the computer to be accessed remotely to be in particular state. If the home or office computer has been powered down or restarted, for example as a result of an automatic operating system update, the remote-access software will not be operative and data on the home or office computer will remain inaccessible. While use of portable computers partially resolves this problem, such portable devices are frequently the target of theft.

Another common problem is missed obligations, such as driver's license renewals, license plate sticker renewals, annual payments and birthdays, just to name a few. Today it is the individual's responsibility to keep up with the many obligations, regardless of notifications by government agencies or the like. Even if a notice, e.g. a license renewal, does not reach the individual, he/she is still held responsible. Appointment books in both manual and computerized form are commonly used to calendar dates, but these systems are not entirely satisfactory. Furthermore, if a computer-based calendar is used and the computer is damaged or crashes, appointments and other dates are lost.

The difficulties of file backup and calendar management are compounded in a multi-user environment, such as a small business. A small organization may use a Local Area Network (LAN) to manage the computers, printers, mail servers and storage devices used by the organization. This requires a significant financial investment in technology and in information technology (IT) professionals to support such LANs. If the LAN fails due to a virus or some other cause, the work of the organization is significantly impaired.

Additionally, if a member of the organization is away from the office's physical location, that person may only have limited access to his electronic workplace. In addition, if the physical office becomes inaccessible, such as due to a fire, flood, or blizzard or the like, the organization will have difficulty functioning.

It is an object of the invention to provide a system, method and computer program product whereby a user can easily select data to be copied to a system computer, and can also easily transfer data back to the user's computer once it has been repaired, or to a new computer if the first computer cannot be repaired following a crash. It is also desirable that the data saved in the system computer may also include appointments, contact information, emails and other data.

It is also an object of the invention to solve compatibility problems between different types of computers, including PDA's and mobile telephones, and operating systems as pertains to data backup, storage and transfer.

It is a further object of the invention to provide a data backup, storage and retrieval system, method and computer program product that operates without any need to install backup, storage, retrieval, file transfer, or other application software on the user's computer. It is desired to have a system that requires only conventional web browser software on the user's computer.

It is another object of the invention to provide a system, method and product that can provide reminders to the user of important appointments and dates, and whereby the dates and other data are secure.

It is a further object to have a multi-user version of the system, method and product that can host multiple users for backup, data storage and retrieval. A multi-user account is particularly suited for business applications where an account administrator could manage the access levels of multiple sub-accounts, each sub-account corresponding to a single user. It is particularly desirable to make the administrator's controls as simple to operate as possible so that a person of limited technical skill can manage the multi-user account so that the small business owner may manage the file system himself without the need for technology professionals or a dedicated network. It is also desirable to have a system where a user can access data from multiple locations and not be tethered to a single physical location where his primary computer is located. It is a further object that such a system not require special software for the user to access and retrieve his data from a remote location.

It is also desirable to have a system with strong security features to prevent unauthorized access. It is desirable that in addition to verifying that the user's username and password, that the system will confirm whether the user's location is known to the system, and if not, the system will require further user authentication information.

Finally, it is an object to provide a system, method and product that quickly enables the transfer of files, especially large files, from one computer to another computer over the Internet.

BRIEF SUMMARY OF THE INVENTION

One or more of the above-listed objects are met or exceeded by each of the embodiments of the data backup, storage and retrieval system, method and computer program product disclosed herein. The various embodiments disclosed combine ease of use with robust functionality. A system embodiment of the invention is provided for use by a plurality of account users to copy selected data between one or more account user computers and a system computer, each account user computer having a storage device, a display and means for operative connection to the Internet. The system comprises a system computer having a system storage device for storing and selectively retrieving data for each respective account, the system computer being operatively connected to the Internet. The system computer verifies account user identification for each account user computer seeking access to the system computer via the Internet. Once this identification has been verified, the system computer may further verify that the account user computer is an authorized computer if access is limited to specific computers. The system computer further scans the storage device of each verified account user computer and causes a first representation of at least a portion of the contents the verified account user computer storage device and a second representation of at least a portion of the contents of the system computer storage device for the corresponding verified account to be displayed on each account user computer display. This enables the account user to select data files, folders or directories to be uploaded or downloaded to or from the system computer. The account user may also access files stored on the system computer storage device from this representation to be accessed and changed so that these modifications are saved directly to the system computer storage device.

A computer program product embodiment of the invention comprises computer executable instructions stored on a system computer readable medium that when read causes one or more computers to execute the following steps: checking for an operative connection between the system computer and a network, and if the system computer is operatively connected; linking an account user computer to the system computer based on an account user identification; scanning the contents of a storage device associated with each linked account user computer; scanning the contents of a partition on the system computer that has been associated with the account user identification; displaying a first representation of the contents of the storage device on the linked account user computer display; simultaneously displaying a second representation of the contents of the partition on the system computer on the linked account user computer display adjacent the first representation; and copying selected files between the connected first computer and system computer.

A method embodiment of the invention is provided for uploading and downloading data between a system computer and a plurality of account user computers, each account user having a system account and an account user identification, the system computer operatively connected to the Internet and capable of being accessed through a system website, the system computer having a data storage device capable of storing and retrieving data for each of a plurality of system accounts. For each user account, the method includes the steps of operatively connecting a first computer to the system website via the Internet; communicating account user identification; verifying account user identification and if verified, operatively connecting the system computer and the first computer; uploading selected data from the user first computer and storing the data on the system computer storage device; operatively connecting a second computer to the system website via the Internet; communicating account user identification; verifying account user identification and if verified; operatively connecting the system computer and the second computer; and downloading at least a portion of said selected data previously stored on the system computer storage device for the user account.

The data backup, storage and retrieval functions described above in regard to the system, program and method embodiments enable an account user to store and retrieve data between his/her computer and a system computer connected to the account user computer over the Internet. The data that can be stored and retrieved includes documents, music files, image files, email and contact information in any file type or format. The system computer is a secure redundant system. If the user's computer fails for any reason, the stored data can be retrieved and loaded onto a new or repaired computer or storage device. All of the software to operate the system is resident on the system computer. Unlike prior art backup, storage and retrieval systems, no hardware or software need be installed on the account user computer beyond a conventional, Java-compatible web browser, which is now a standard feature on nearly all computers. Because these conventional Internet tools are utilized, compatibility problems are solved allowing the system of the invention to function regardless of different hardware platforms and operating systems.

Preferred embodiments of the system also contain a scheduler, a contacts manager, a reminder generator and/or a file transfer system for third-party users. The scheduler includes the ability to store appointments for days or months in advance and then to either view, print, download or email a daily schedule to the user. The reminder generator is setup to track important dates, and generate periodic reminders. The contacts manager stores contact data in an electronic address book. All of these functions are resident in the secure, off-site redundant system computer. Accordingly, any damage to the account user's computer will not result in lost information. Further, because the system computer can be accessed by an account user from the home, office or practically any computer having Internet access, the system computer can be used as a virtual network server. Thus, for example, an account user can access and view his/her address book and other data from mobile computers, including notebooks, PDA's and mobile telephones.

The third-party file transfer system comprises a mechanism for the account user to create a second user name and password for access only to designated data. Accordingly, the account user can upload data files and folders to the system computer, and grant access to a third party to download those files. The account user can create varying levels of access controls for such third-party users and may set, change and revoke such passwords through an account management portal. The process facilitates data transfer to third parties, and is particularly well suited to transfer files too large for email transmission and folders containing multiple files that cannot be emailed as a folder.

Yet another embodiment of the storage and retrieval system of the invention is directed to a multi-user system where a single account is divided into sub-accounts. The sub-accounts are managed by an account administrator that can set various levels of access for the individual account users. Preferably, this account management function is accomplished using an easy-to-use graphical interface. Further, the account administrator can post items to a master schedule that is then placed on the schedules of the holders of the sub-accounts.

Further embodiments of the storage and retrieval system of the invention include security features to prevent unauthorized access to the system. Such security features may include limits on the computers from which the system may be accessed unless the user can successfully provide additional proof of his identity. Such additional proof may include answering challenge questions previously created by the user.

Additional features and benefits of the storage and retrieval system of the invention will become apparent from the drawings and detailed description of the preferred embodiments.

DETAILED DESCRIPTION OF THE PREFERRED EMBODIMENTS

Before discussing exemplary embodiments of the present invention in detail, it will be appreciated that the invention may be embodied in a system, method, and/or a computer program product. For example, a method of the invention may be carried out by one or more users using computers, and a program product of the invention may include computer executable instructions that when executed by one or more computers cause one or more computers to carry out a method of the invention. Further, one or more computer(s) that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Figure 1:
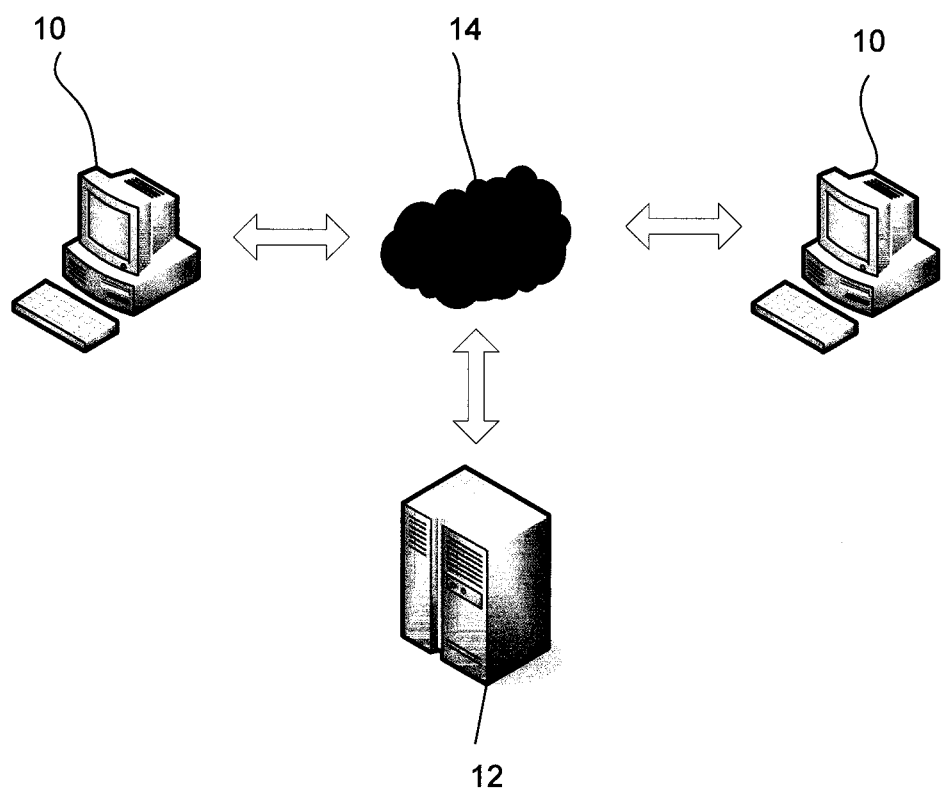
FIG. 1 is a schematic of a multi-user data transfer system.
Figure 2:
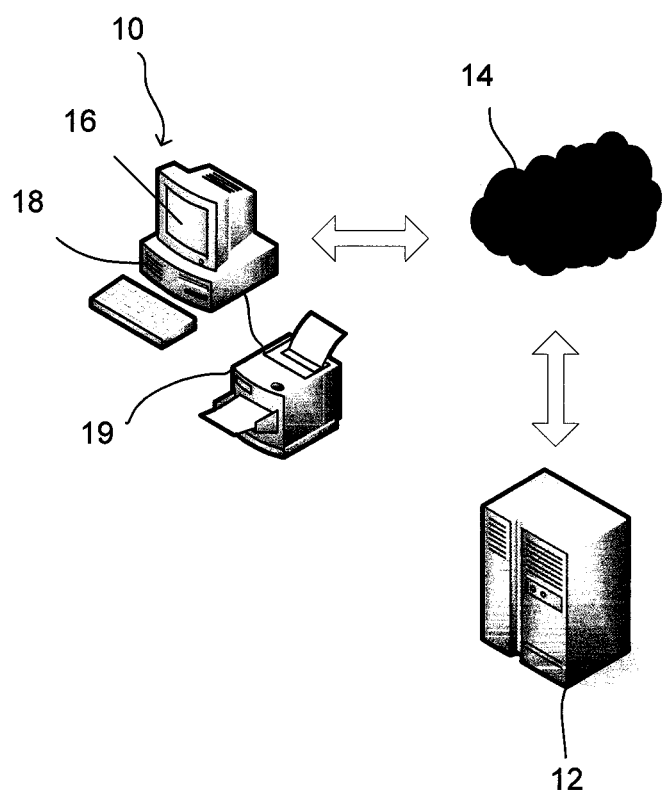
FIG. 2 is a schematic of the system showing an account user computer linked to a system computer.
Figure 3:
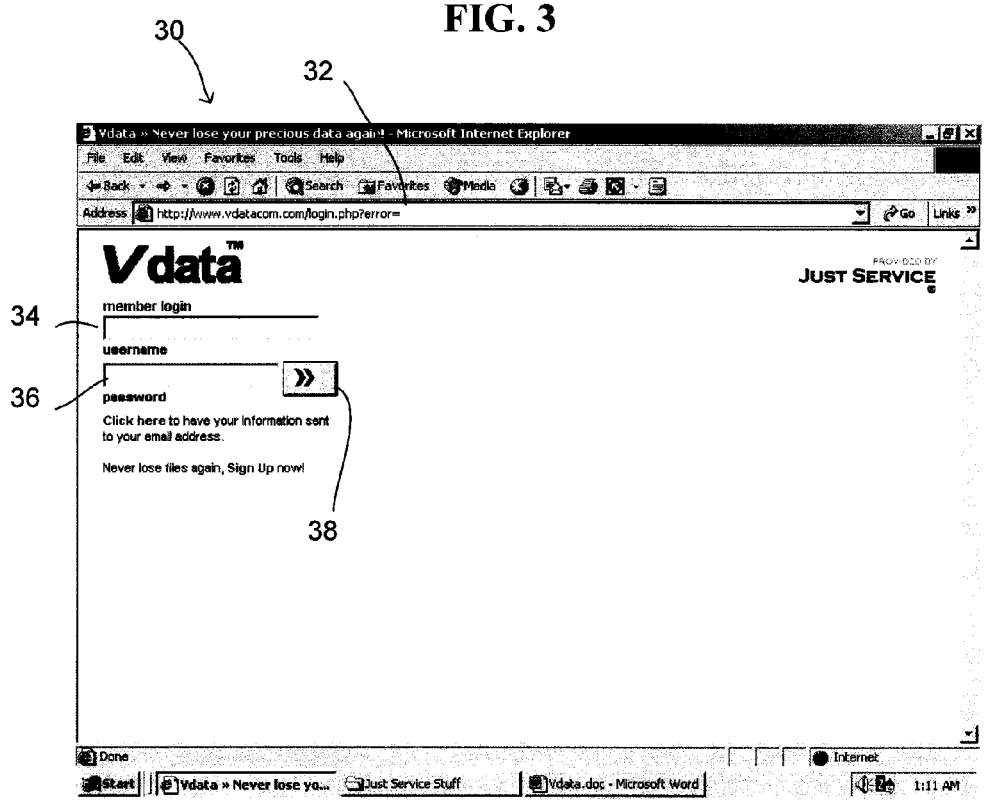
FIG. 3 is a display of a login screen enabling a user to access the data transfer system.

Turning now to FIG. 1, a first embodiment of the file backup, storage and retrieval system of the invention is shown. One or more account user computers 10 are connected to a system computer 12 over the Internet 14. The account user computer 10 can be any type of computer, including mobile, home and office computers. The term "computer" is used herein to include any device having a processor capable of executing program instructions, including but not limited to personal computers, notebook computers, hand held personal digital assistants ("PDA") and mobile phones. As used herein the term "account user computer" refers to any computer from which an account user can access the Internet 14 and system computer 12. As shown in FIG. 2, account user computer 10 has a display 16 and at least one data storage device 18, for example, a hard drive. Account user computer 10 may also be attached to a local printer 19. Any type of hardware and operating system can be used. Web browser software is required, but any browser can be used provided it has a Java plug-in. Substantially, all current browsers have Java. Beyond a common browser, no specialized hardware or software need be installed on account user computer 10 to fully utilize the features disclosed herein. However, the account user computer 10 may also have standard software installed on it to enable the account user computer to manipulate the stored data.

Further, the data stored on computer 10 for which backup or storage is desired can be of any type or format. The present system thereby solves compatibility problems associated with different brands of computers, which is of particular significance with regard to handheld devices and mobile telephones.

System computer 12 preferably comprises multiple redundant computers with redundant data storage devices. In a preferred embodiment, system computer 12 comprises a secure, high speed Unix-based computer behind a 3-layered firewall system that performs a once a day backup of itself to three separate backup computers. System computer 12 includes least one storage device 20 that can store account user data and selectively retrieve data applicable to a specific account only. System computer 12 also hosts the software that operates the backup, storage and retrieval system of the invention. Because all of the software to operate the system is resident on the system computer, account users are spared the inconvenience and burden of loading or downloading specialized software onto their computers. It follows that all system updates are made only to the system computer, thereby sparing the account users for any need to periodically update software.

In order to access system computer 12 from an account user computer 10, the user navigates to a system website 32 via the Internet, e.g., <vdatacom.com>, <vdataoffice.com>, <vdatanetworks.com>. After reaching the system website, the account user clicks on a login button, and a login screen 30 appears on user's display 18, having been generated by system computer 12. The user enters his or her user name 34 and password 36, and then selects the enter button 38 to transmit this data to the system computer 12 for verification. This submission of the login and password information can be encrypted using conventional means. The system preferably checks and the IP address of the account user computer 10. Other verification means can be used in lieu of or in addition to the user name and password, for example, the system software can be programmed to check and verify the serial numbers of component parts or other encrypted data unique to the system user computer.

Further, the system may include a security system to prevent unauthorized access. This security system will lock a user account after a number of unsuccessful attempts to log on. Further, the IP address from which a user attempts to access the system may be logged each time access is attempted. Such systems, which are well-known in the art, customarily lock out the user after three attempts. After the third unsuccessful attempt, the user must contact the system manager to obtain a new password. Father, if the IP address from which the unsuccessful attempts were made is not an IP address associated with the user's account, any further attempts to access the system from this IP address will be blocked until the system manager removes the block.

Figure 22:
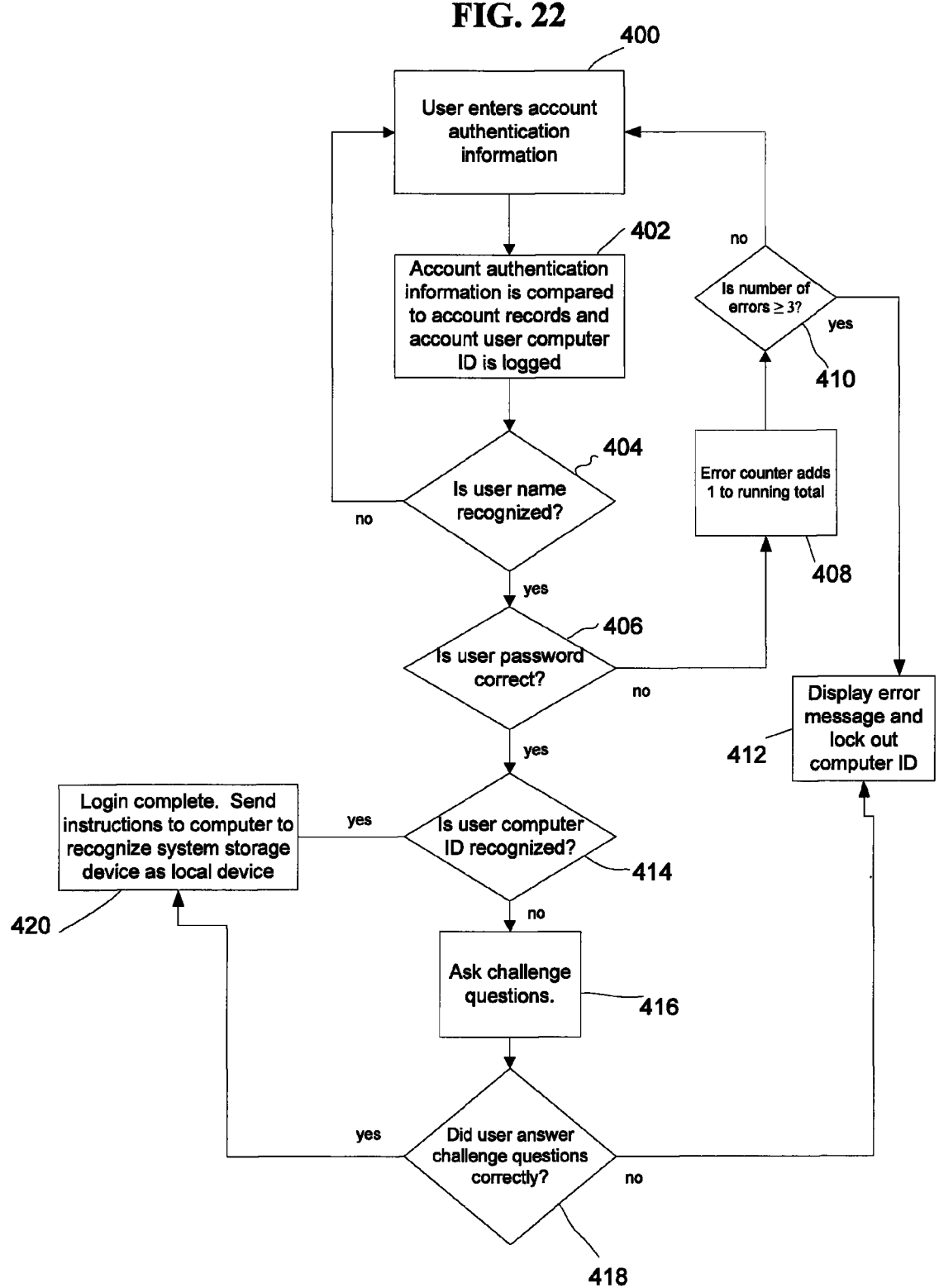
FIG. 22 is a flowchart illustrating the operation of the user login and verification program.

As shown in FIG. 22, account authentication information, typically a username and password, is submitted at step 400. The identity of the account user computer 10 being used may optionally be logged as well. The identity of account user computer 10 is preferably the IP address of account user computer 10, but may also be determined by the other means such as the serial number of the computer.

The submitted password is then compared with password information stored at system computer 12 at step 402. If the username is not recognized at step 404, the program returns to step 400 and the system again requests verification information. At step 406 the program checks the user's entry with the account password. If the entry is incorrect, an error counter logs the failed attempt to access the system at step 408. If the user has not exceeded a maximum number of unsuccessful attempts permitted by step 410, the program returns to the password entry screen. Otherwise, the program displays an error message at step 412 and locks out the user and the IP addresses of the computers from which the attempts were made. If the identity of account user computer 10 does not match the information associated with the account, the log-in fails and the user receives an error message at step 412.

The system may include an additional level of security once the user's password has been authenticated. If the IP address is not one associated with the user's account 414, the system may ask the user one or more challenge questions at step 416 to verify the user's identity. Such questions could include the name of a childhood pet, a street the user grew up on, the user's elementary school, the user's kindergarten teacher, etc. These questions should be easy for the user to remember, but difficult for anyone else to guess. These challenge questions prevent a thief or other unauthorized user from stealing the user's password and then logging in from their own computer. If the challenge question is answered correctly at step 418, the access protocol is completed at step 420. Otherwise, the user's attempts to log on is rejected and the user is returned to step 412.

After the user has successfully passed the challenge questions, the system will then ask the user if he wants the IP address of the current computer to be associated with the account. If the user is using a computer in the business center of a hotel, the user may decline to add this IP address. This prevents a person looking over the shoulder of the user from being able to obtain the password and then log in as this unauthorized user.

When the system computer is successfully accessed from an authorized machine, the system initiates a program at step 418 that causes the account user computer 10 to recognize the user's account on the system computer 12 as a local storage device. The program of step 418 enables the user to open data files directly from the user's account on the system computer storage device 20 and to save data files directly to the user's account on the system computer storage device. This avoids problems associated with the creation of a local temporary copy of a data file, including unintentionally saving corrections to the local drive rather than the system computer storage device. It also eliminates the steps of having to first save the file to a local storage device and then transferring the file to the user's account on the system storage device. This feature is highly desirable when local storage is either unavailable or it is undesirable to save a file onto the local storage device.

Any software applications necessary to utilize files opened from the system storage device 12 may be contained on the account user computer 10. Alternatively, such applications may be provided over the Internet 14 from the system computer 12 or an application service provider (ASP) operatively connected to the Internet. When the user logs out of the system, the program sends an instruction to the account user computer 10 that the system storage device 20 is no longer available.

Figure 4:
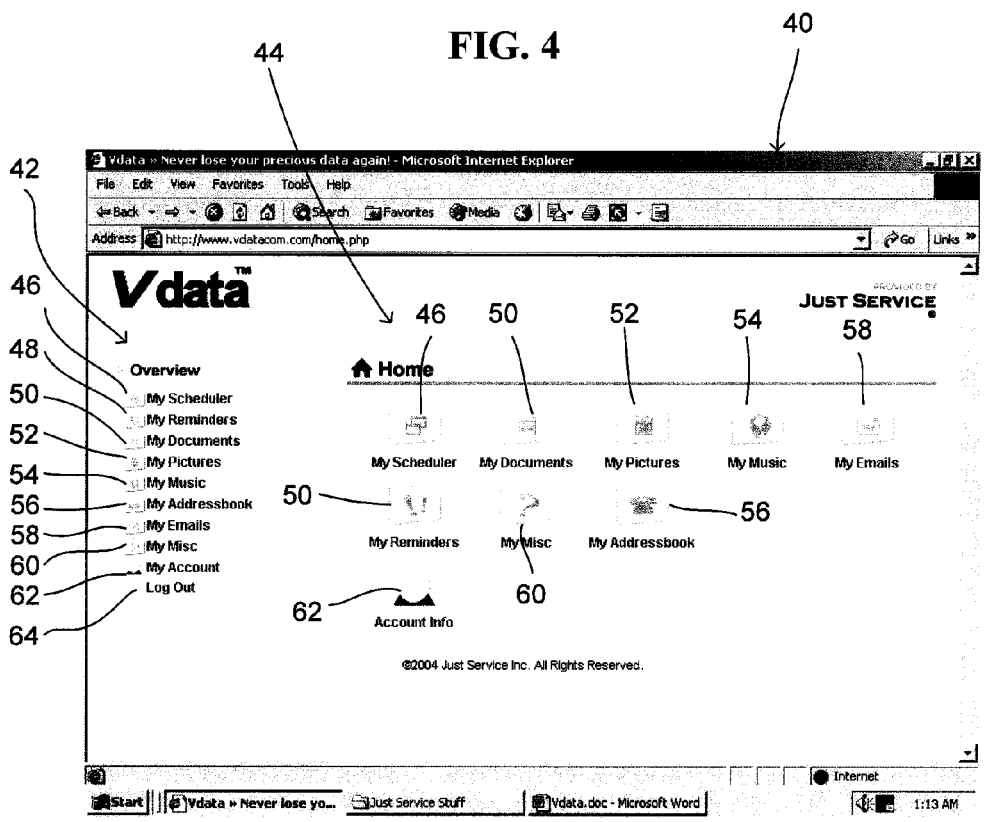
FIG. 4 is a display of a base or main menu page of the data transfer system.
Figure 5:
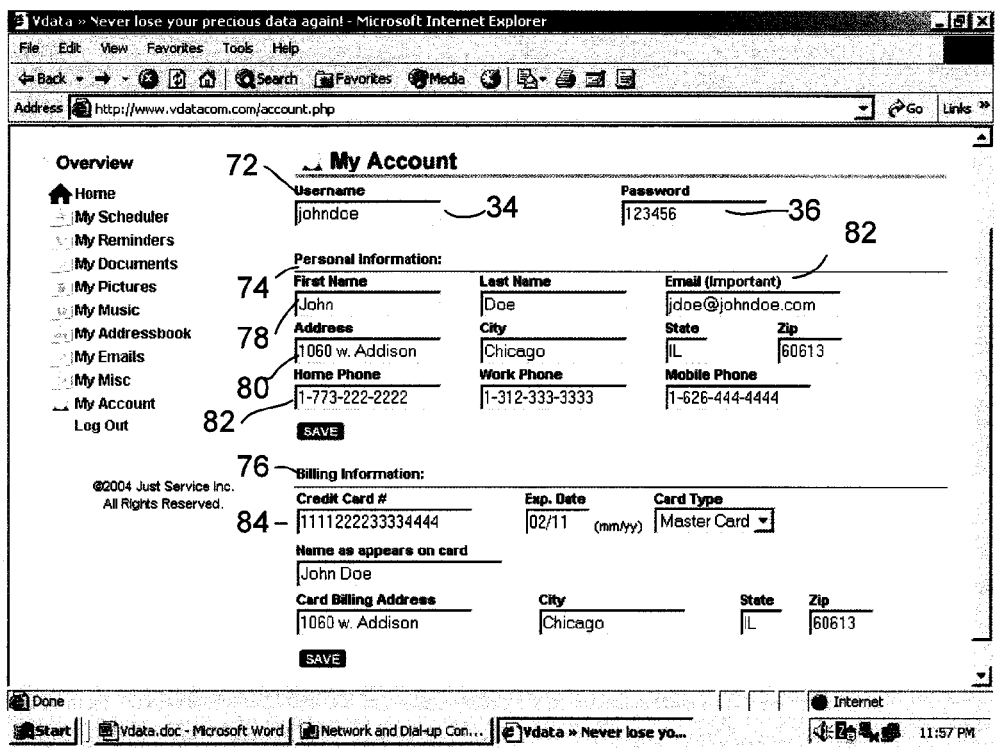
FIG. 5 is a display of account information screen for a particular user of the data transfer system.
Figure 24:
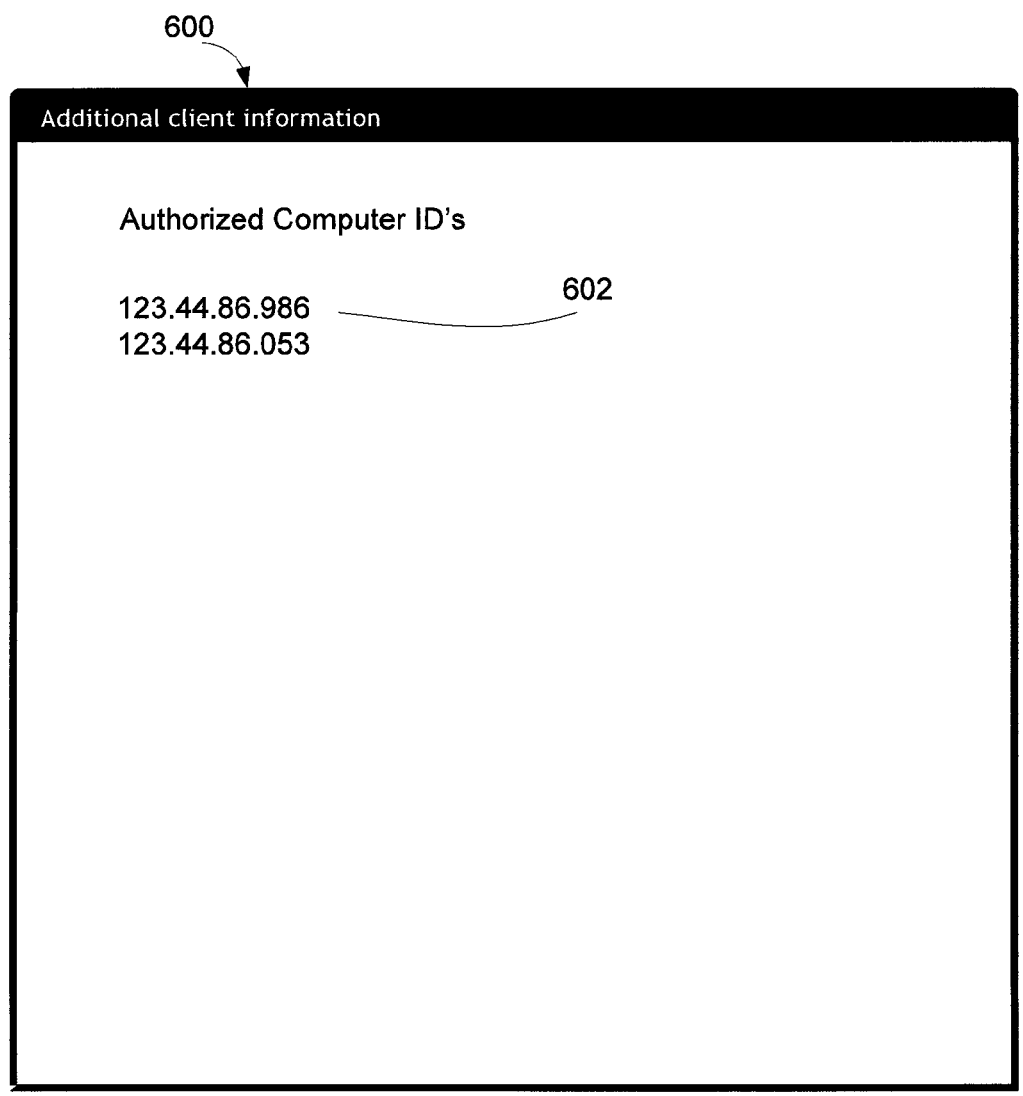
FIG. 24 is a display of additional account information screen for a particular user of the data transfer system.

Once the user has successfully accessed the system computer 12 by logging-in, base screen 40 is shown on display 18, as shown in FIG. 4. Base screen 40 optionally includes two different representations of the system functions. One representation is a list view 42 of the system functions and the other representation is an icon view 44 of the system functions. Each representation includes one or more of a scheduler link 46, a reminder system link 48, a document storage and retrieval system link 50, a picture storage and retrieval system link 52, a music storage and retrieval system link 54, a contact storage link 56, an email storage link 58, a miscellaneous storage link 60, and an account manager link 62. A logout link 64 is also provided with the list view 42. List view 42 preferably appears on every screen display of the system to enable the user to navigate between functions. Clicking any of the above links initiates a routine corresponding to the function associated with the selected link. The system computer 12 thereby functions as a virtual network server. It allows the user to view and use data from almost any location, using nearly any type of computer, including hand held PDAs and mobile telephones. In order to use the system, the user first establishes an account using an account manager 70 that is accessed through account manager link 62. As shown in FIGS. 5 and 24, an account manager link includes a template for entry of account-related information. Such information includes the account user identification (e.g., a user name 34 or 72 as shown in FIG. 5 and password 36), personal information 74 and billing information 76. Personal information 74 includes a name 78, a physical address 80, an electronic communication address 82 (e.g., an email address), phone numbers 84. Billing information 76 includes standard credit card information including the credit card number, type, expiration date, the name appearing on the card, and the card billing address. Further, as shown in FIG. 24, the account user may also add additional optional account restrictions 600, such as an authorized computers roster 602 from which the user may access the system.

Figure 6:
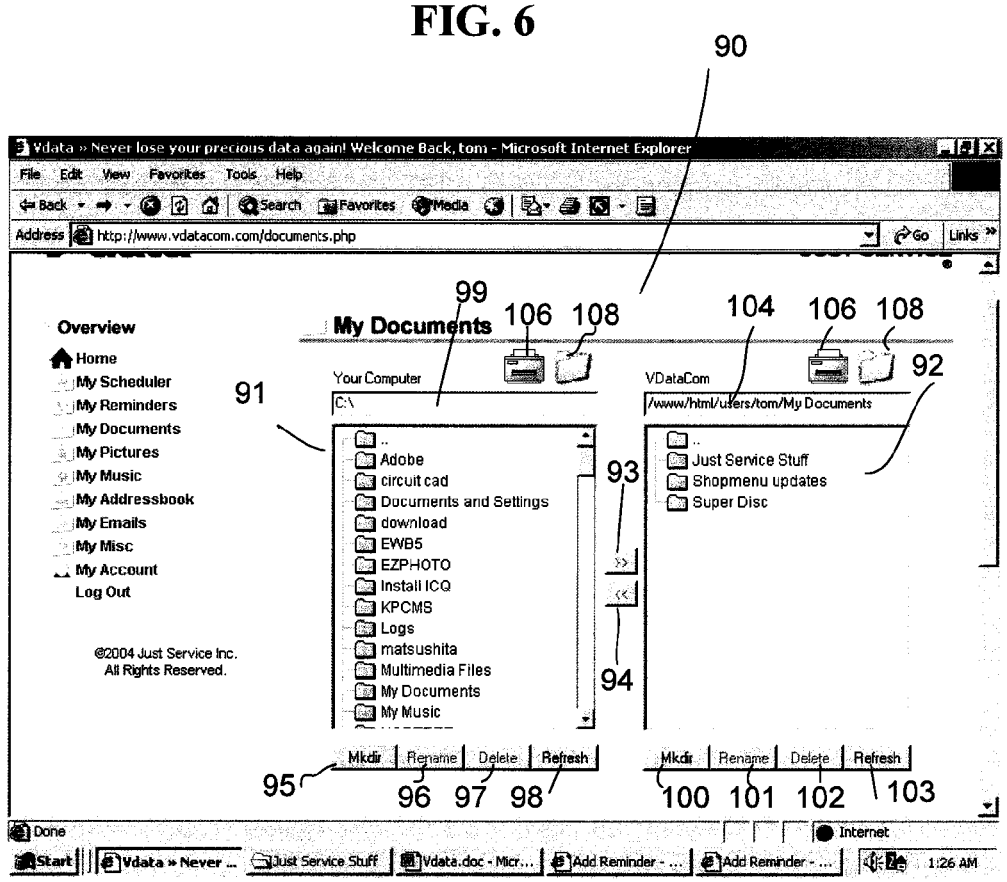
FIG. 6 is a display of a document transfer function of the data transfer system.

Turning now to FIG. 6, the document storage and retrieval system 90 is accessed through document storage and retrieval function link 50. The system computer then scans the account user storage device 18, and generates a first virtual representation 91 of at least a portion of the account user storage device 18. The system also scans the system storage device 20 to retrieve previously stored data associated with the applicable user account, and displays a second virtual representation of at least a portion of such data. These two representations can be displayed on the account user computer display 18 in any manner or sequence, but preferably they are displayed simultaneously, in a single window, side-by-side. The transfer system 90 display also includes at least one, but preferably plural data transfer buttons 93, 94. To copy data from account user storage device 18 to the system storage device 20, the user selects one or more files, folders or directories to be transferred on the first virtual representation 91 and a destination location on the second virtual representation 92, and clicks on a first file transfer button 93. To copy a file stored on the system storage device 20 to the account user's storage device, the user selects the files or folders to be transferred on the second virtual representation 92 and a destination location on the first virtual representation 91, and clicks on a second transfer button 94. Preferably, transfer buttons 93, 94 include arrows to show the direction of file transfer. In operation, the system copies the data from the source to the target regardless of data file format of file, for example, encrypted files will be transferred as is. In an alternative embodiment, a user can copy data by dragging one or more files, folders or directories to be transferred on the first virtual representation 91 and dropping them in the second virtual representation. Likewise, a user can copy data by dragging one or more files, folders or directories to be transferred on the second virtual representation 91 and dropping them in the first virtual representation Each virtual representation includes options to create new directories 95, rename files 96, delete files 97, or refresh 98 the virtual representations to reflect recent files or directories copied from the storage device to the other. The user can create a new directory on the account user storage device 18 by selecting the directory creation function 95. Files or folders on the account user storage device can be renamed by selecting the rename function 96. The new name for the file or folder is entered at data entry box 99 for the first virtual representation 91. Files or folders can be deleted from the account user storage device 18 by selecting files or folders on the first virtual representation 91 and selecting the delete option 97. The virtual representations 91 can be refreshed to reflect recently copied files by selecting the refresh option 98.

A saved document can be printed by selecting a saved document and then clicking print button 106 which sends the document to local printer 19. Similarly, a saved document can be opened by either double-clicking on the file name or by selecting it and then clicking the open file button 108. Assuming software compatible with the selected file type is available either from the account user computer 10, the system computer 12, or over the Internet from an ASP, the document will then be opened in that program. The user will then be able to modify the data and then directly store the updated version on the account user computer storage device.

The user can create a new directory on the system storage device 20 by selecting the make directory function 100. Files or folders on the system storage device can be renamed by selecting the rename function 101. The new name for the file or folder is entered at data entry box 104 for the second virtual representation 92. Files or folders can be deleted from system storage 20 by selecting files or folders on the second virtual representation 92 and selecting the delete option 102. The second virtual representation 92 can be refreshed to reflect recently copied files by selecting the refresh option 103.

Figure 7:
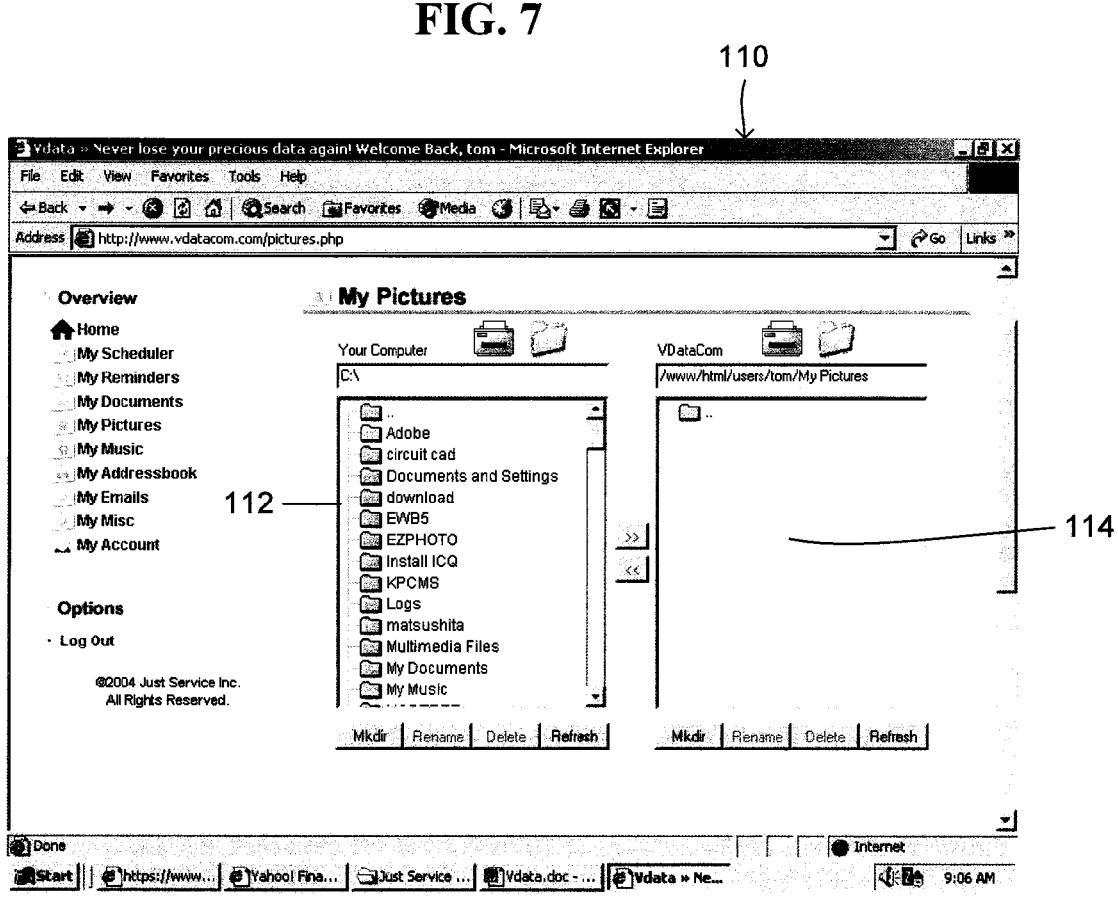
FIG. 7 is a display of a picture transfer function of the data transfer system.
Figure 8:
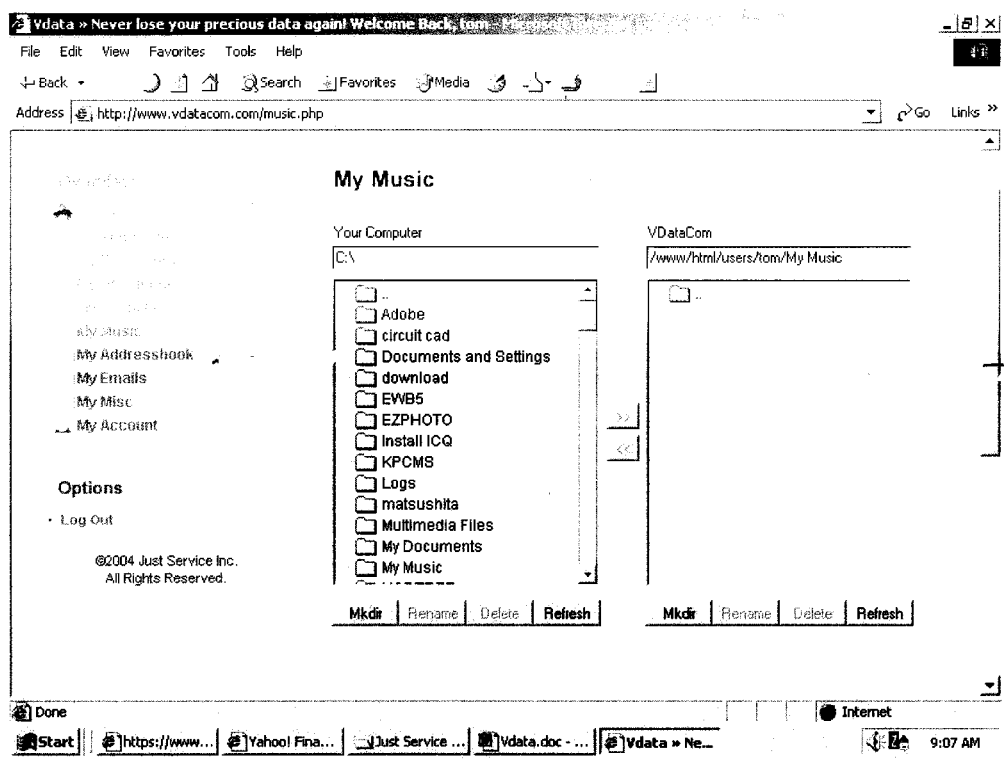
FIG. 8 is a display for a music transfer function for the data transfer system.

Turning now to FIG. 7, picture storage and retrieval system 110 is accessed by selecting the picture transfer system link 52 from base screen 40. As with the document storage and retrieval function 52, multimedia storage and retrieval system 110 includes a first virtual representation 112 of the account user storage device 18 and a second virtual representation 114 of the account user partition on the system storage device 20. The picture storage and retrieval buttons operates in the same manner as the document storage and retrieval systems as described in reference to feature numbers 91-108 in FIG. 6.

Figure 9:
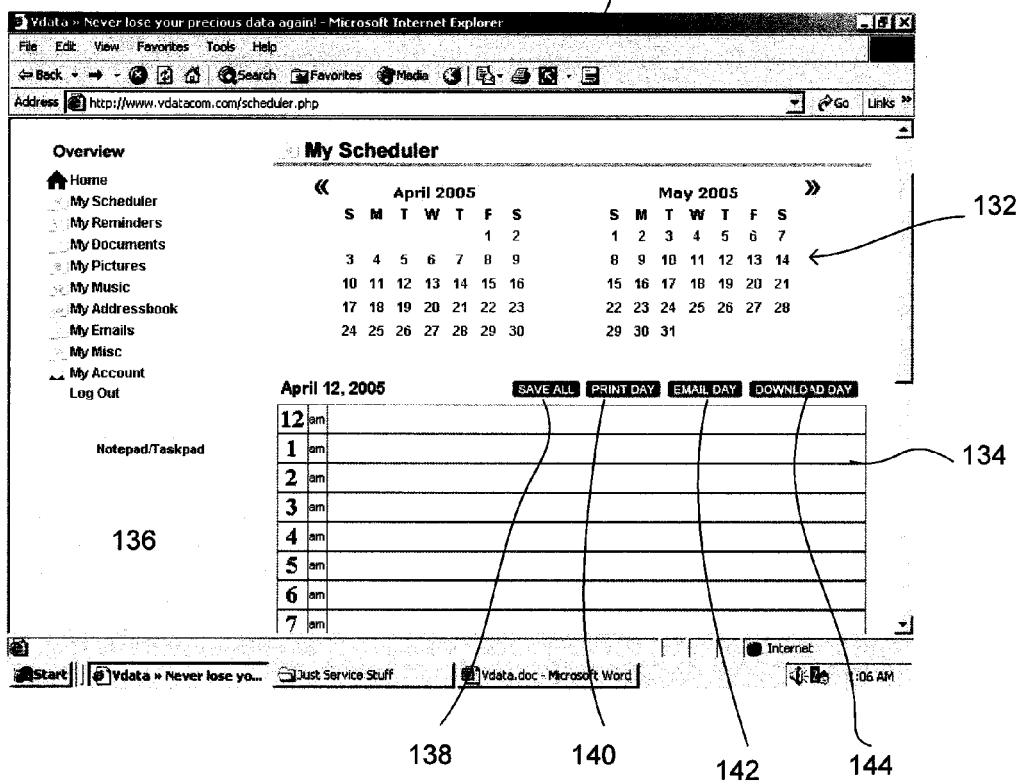
FIG. 9 is a display for a scheduler function for the data transfer system.

FIG. 9 shows the scheduler 130 that is accessed by selecting scheduler link 46 from account user screen 40. Scheduler 130 preferably has one or more monthly calendars 132 and a daily diary 134. The daily diary 134 displayed corresponds to the day selected on the monthly calendar, where the user can view previously entered appointments and reminders. This area also contains an optional task notepad 136 whereby the user can enter notes or other information.

Once a calendar entry has been entered, the user stores it by selecting the save button 138. The account user can also print his or her daily diary by selecting print button 140 or the user can email a daily calendar by selecting send button 142. Alternatively, the user can download the daily calendar by selecting download option 144. Preferably, the calendar function is compatible with the account user's mobile computer (s), such as a PDA.

Further, a user may have more than one scheduler 130. For example, a user may have one scheduler for work entries and a second scheduler for personal/family entries. Alternately, in an office environment where a single employee maintains schedules for multiple professionals, the employee could create a separate scheduler for each professional. In an environment with multiple schedulers, an entry may be made on a single scheduler (e.g. an appointment for a specific professional) or on all of the schedulers (e.g. a staff meeting).

Figure 10:
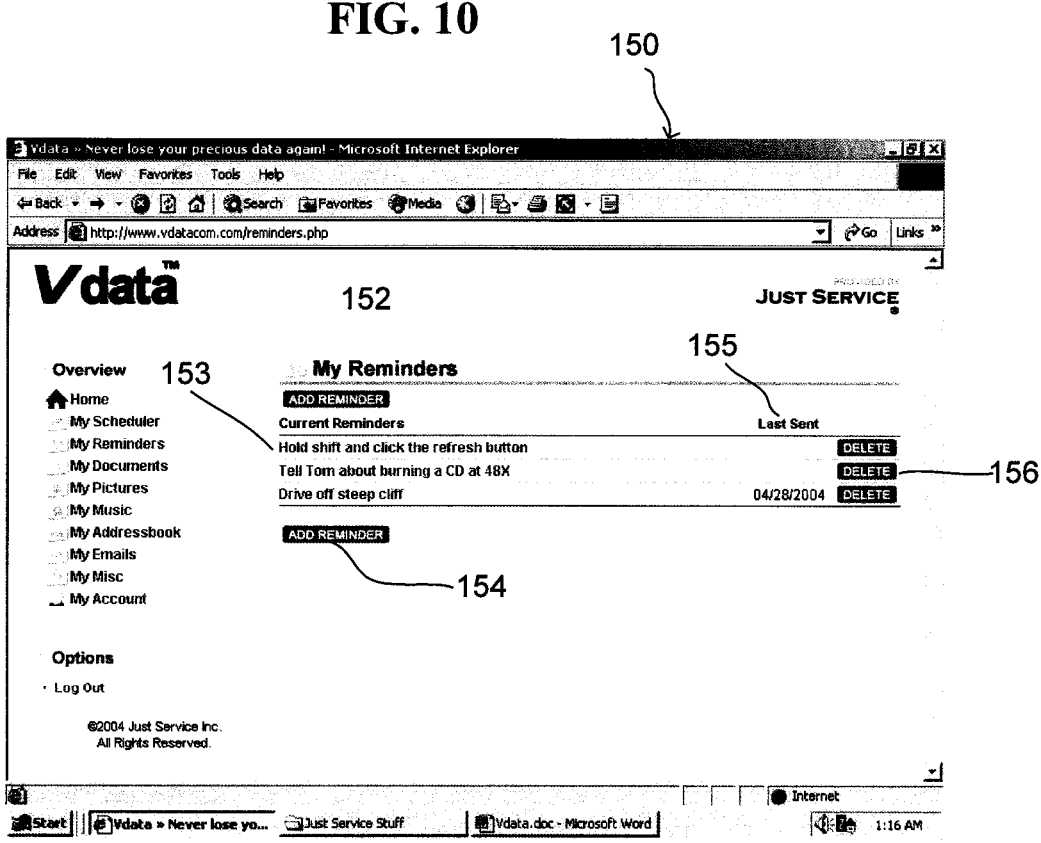
FIG. 10 is a display of a reminder function for the data transfer system.
Figure 11:
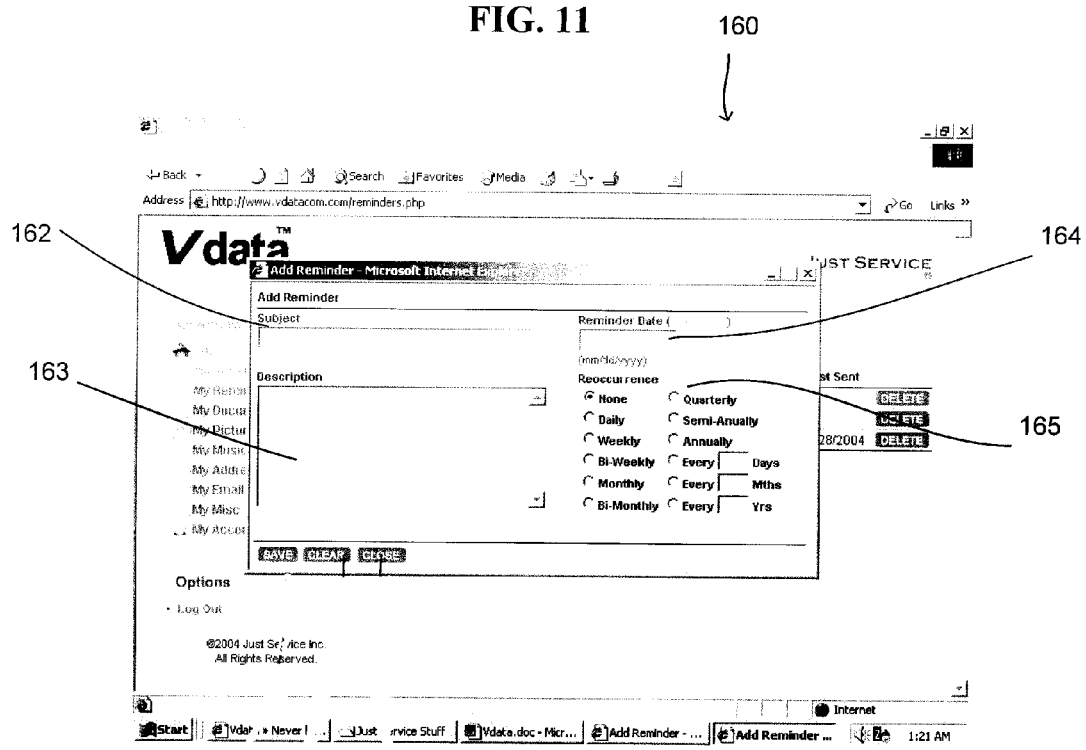
FIG. 11 is a display of a data entry screen for the reminder function.

The reminder system 150 is shown at FIGS. 10 and 11. It is accessed by selecting the reminder system link 48 from any screen. Reminder screen 152 as shown in FIG. 10 provides a list of reminders, including the subject 153 and an indication of the last time that the reminder was generated 155. The user may also add new reminders by selecting add reminder option 154, or delete an existing reminder using delete option 156. Each reminder may be added or deleted individually.

If the user selects the add reminder option 152, an add reminder window 160 appears as shown in FIG. 11. Window 160 presents a template that directs the user to input a reminder subject 162, a reminder description 163, and an initial date 164 of the reminder. The user may also select a frequency 165 that this reminder may be generated. The frequency can either be a single occasion, or it can be set for any periodic reoccurrence period, including daily, weekly, biweekly, monthly, bimonthly, quarterly, semiannually, annually; or it can be set to occur at specified number of days, months, or years. The reminder function enables the user to enter data that may not necessarily be in computer form that is of particular importance, for example, scheduled payments such as tax or credit card payments, and appointments that may already be in the scheduler.

The system is programmed to generate an email reminder to the account user based on the reminder date 164 and additionally based on the reoccurrence frequency 165 specified. The account user email address is preferably the account email address 82 described above. The system could be modified to accept alternative email addresses, however. Furthermore, other types of reminders could be generated in addition to or in lieu of email. All of the reminder data as well as the software are resident in the system computer 12. Accordingly, reminders will not be affected if the account user computer 10 is damaged and replaced.

Figure 12:
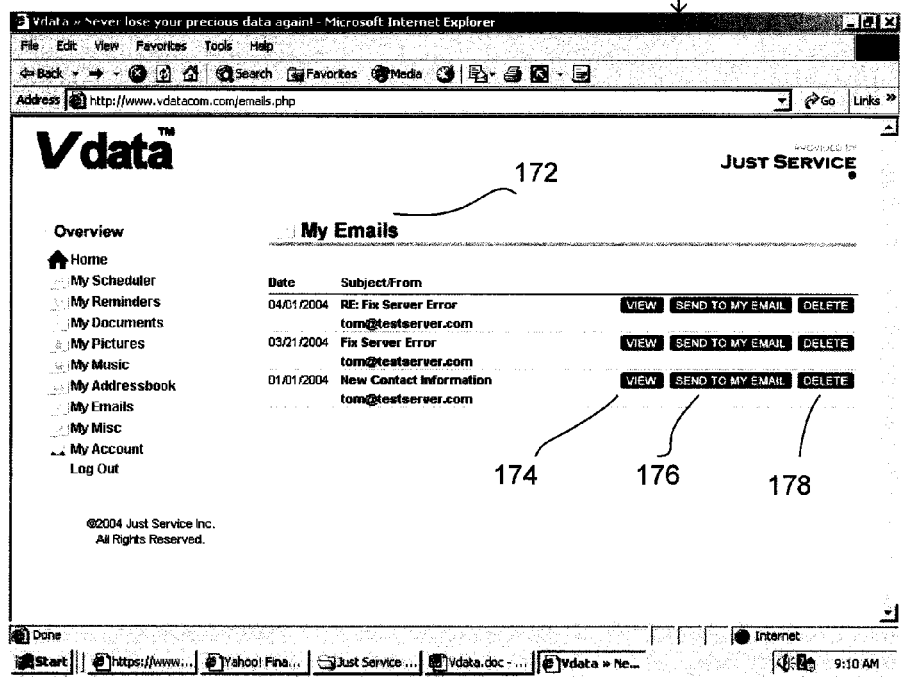
FIG. 12 is a display for an email storage function of the data transfer system.

Turning now to FIG. 12, an email storage system 170 lists the emails that have been saved to the system computer. Email can be saved to the system computer 12 by either forwarding selected emails to an email address associated with the system, or by exporting email from the account user email program. Saved email list 172 indicates the date that the email was originally received, the subject of the email and the original sender. To view a particular email, the user selects the corresponding view email button 174. To send a particular email to the user's current email account (as defined by email address 80 entered in the account manager), the user selects the email send option 176. To delete an email that is no longer of importance, the user selects the delete email option 178.

Figure 13:
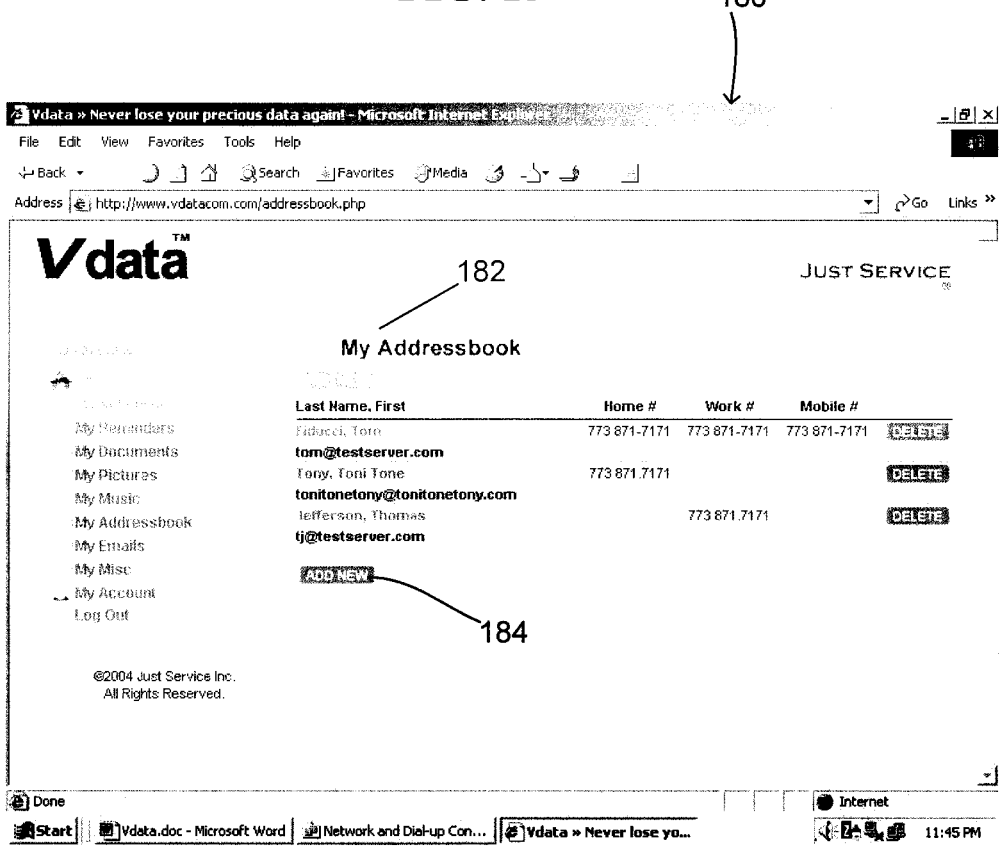
FIG. 13 is a display of the main screen for a contacts function of the data transfer system.

Turning to FIG. 13, the contact manager 180 is shown. Contact manager includes a contact list 182 where summary contact details are shown. Such summary contact details include the contact's name, email address, and phone numbers. To obtain more detailed information, the user selects the hyperlink associated with the entry, which is typically the contact's name. This screen also displays additional information and notes regarding the contact. To add a contact, add new contact button 184 is selected.

Figure 14:
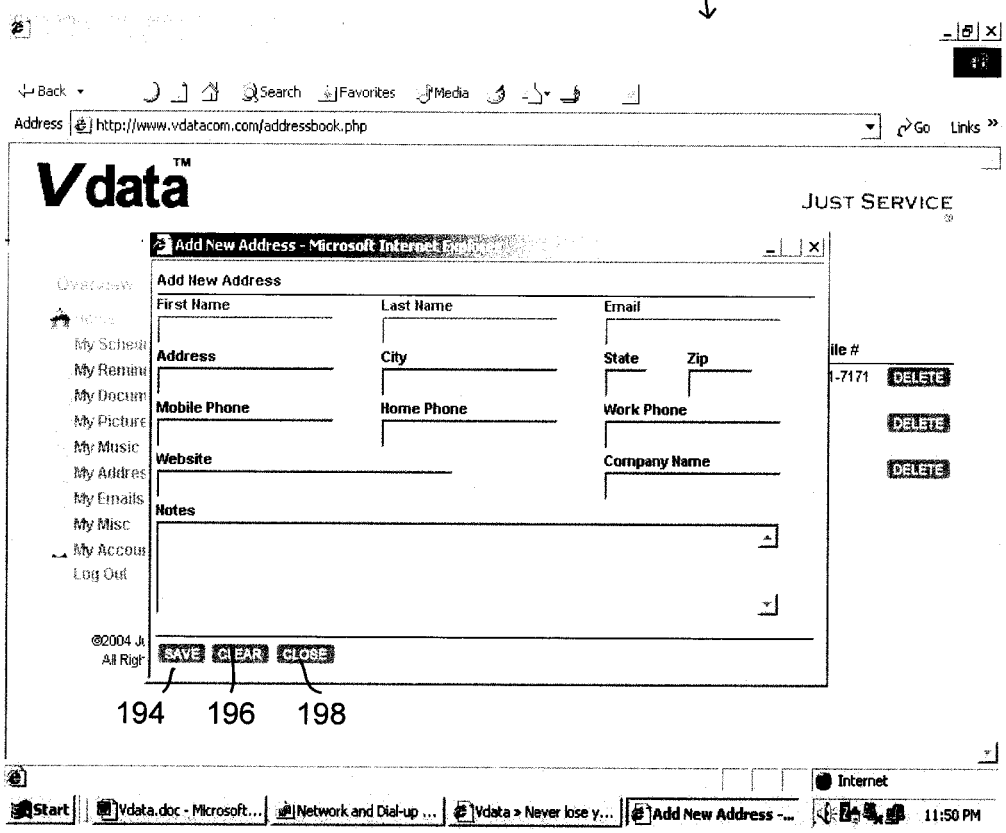
FIG. 14 is a display of a data entry screen for the contacts function.

The "Add New" button 184 launches contact adder 190, as shown in FIG. 14, which presents a template whereby the user can enter the aforesaid contact information. Once contact information has been entered, the user can save this information by selecting the save button 194. Alternately, the user can clear the contact fields by selecting the clear option 196. The close button 198 terminates the contact adder 190 and returns the user to the contact manager 180.

Preferably, the contact manager is compatible with PDAs and mobile telephones. Further, it is preferred that the account user computer contact files can be uploaded and stored in the contact manager. Thus, if the account user notebook computer, PDA or mobile phone is lost, damaged or stolen, the account user can log back into the system to download or view his/her contact data. This is also useful for individuals that upgrade or otherwise change equipment or service providers. In many cases, the address book from one mobile telephone will not work with another telephone. PDA handheld devices have the same problem; the data cannot be moved from one brand to another brand of PDA. With the present system the contact data stored in one mobile telephone or PDA can be transferred to another without compatibility problems.

Figure 15:
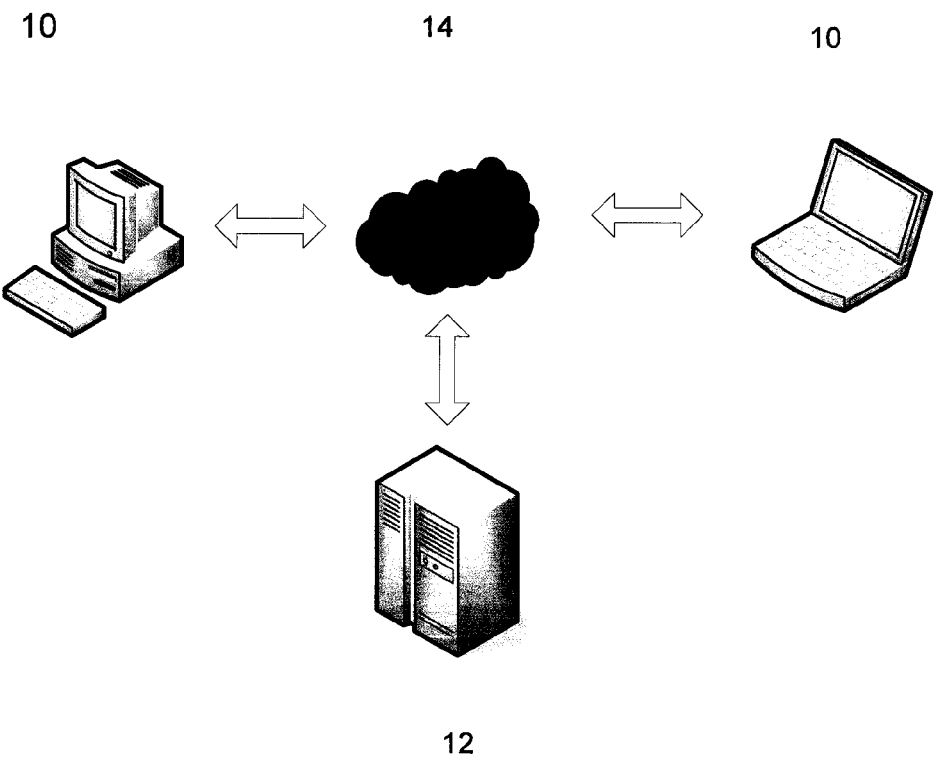
FIG. 15 is a schematic showing an account user and remote user connected a system computer over the Internet.
Figure 16:
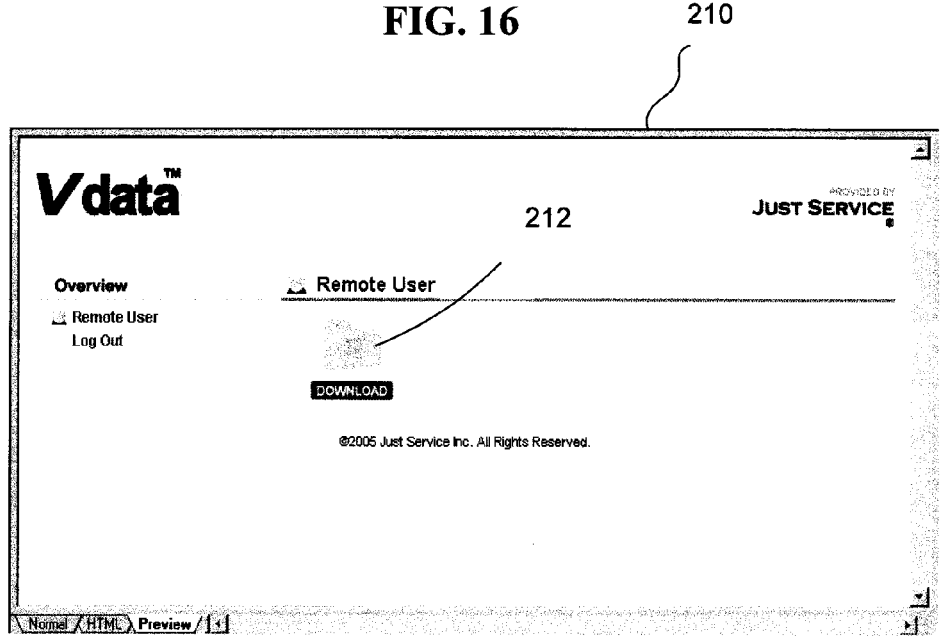
FIG. 16 is a display of an account user screen for provision of remote user access.
Figure 17:
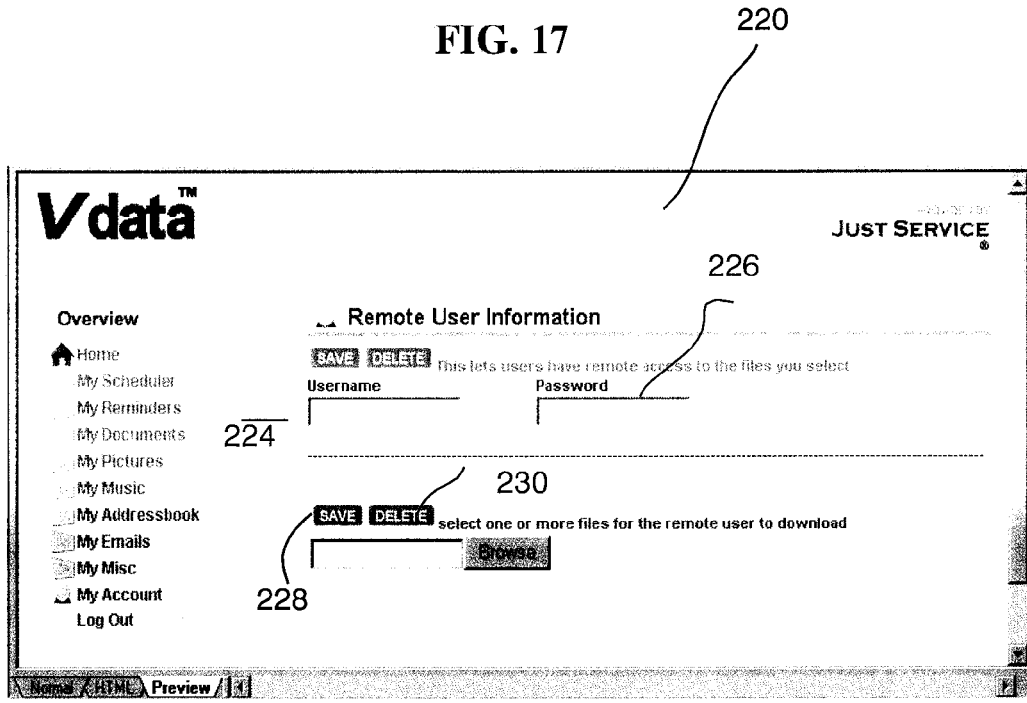
FIG. 17 is a display is a display of a remote user access screen.

The system also has a third-party data transfer function 210, as shown in FIGS. 15-17. Through this option an account user can use the system to transfer data to third parties, including files, folders and entire directories. Large data files and folders can be easily transmitted that normally, due to their size, would be difficult or impossible to transfer electronically. Conventional email programs typically have a size limit on the files that can be transferred, typically between 1 and 10 Mb. An extremely large file or folder, for example a multimedia data, may not be transferred easily. In the past such files could only be transferred by saving them on portable media such as a CD-ROM, a flash drive or ZIP drive and sending the media to the third-party.

The basic arrangement for third party data transfer is shown in FIG. 15 wherein a file on account user computer 10 can be transferred to a third-party computer 22. To transfer data, the account user navigates to a remote user information screen 220 (FIG. 17) and creates a third-party identification, e.g., a user name 224 and password 226 for the third-party user. Preferably, the user name 224 is the email address of the third-party user. If the account user does not wish to create a password for the third-party user, the system may randomly generate passwords 226 for third-party users.

A user can create multiple third-party users with limited access to the main account in this manner. Further, these passwords can be changed or revoked at any time. Once created, the account user then uploads the selected files to the system computer 12 in a manner similar to that described above in reference to document transfer. The files are copied to a storage device on system computer 12. The account user can save 228 or delete 230 files as desired. The account user then informs the third party of the web address of the system computer, and the third party user name and password, e.g., by telephone or email.

If the third-party user has his own account or sub-account on the system, the files may be copied to the third-party's own third-party files folder. The system determines whether a third-party user is a system account user by comparing the email address for the proposed third-party account with email addresses associated with accounts on the system.

If the third-party user is not an existing system account user, the third-party user will navigate to the system website as shown in FIG. 17, where a Remote User login page 210 is located. The third-party can then login to the system computer to access and download the designated data 220. Preferably, the third-party user's access is limited to being able to download only the data specifically designated for transfer to the particular third-party by the account user. The third-party user may see only a display 210 with a single folder 212, as in FIG. 16, or the third-party user may see a display similar to the main menu page (FIG. 4) where all folders other than the third-party data folder are shown as inaccessible. In addition, the third-party may be provided an option to upload files to the system for access by the account user. The third-party need not be an account user. Again, because all software is resident on the system computer, there is no need for third party to install or use any special hardware or software beyond a conventional web browser.

Figure 25:
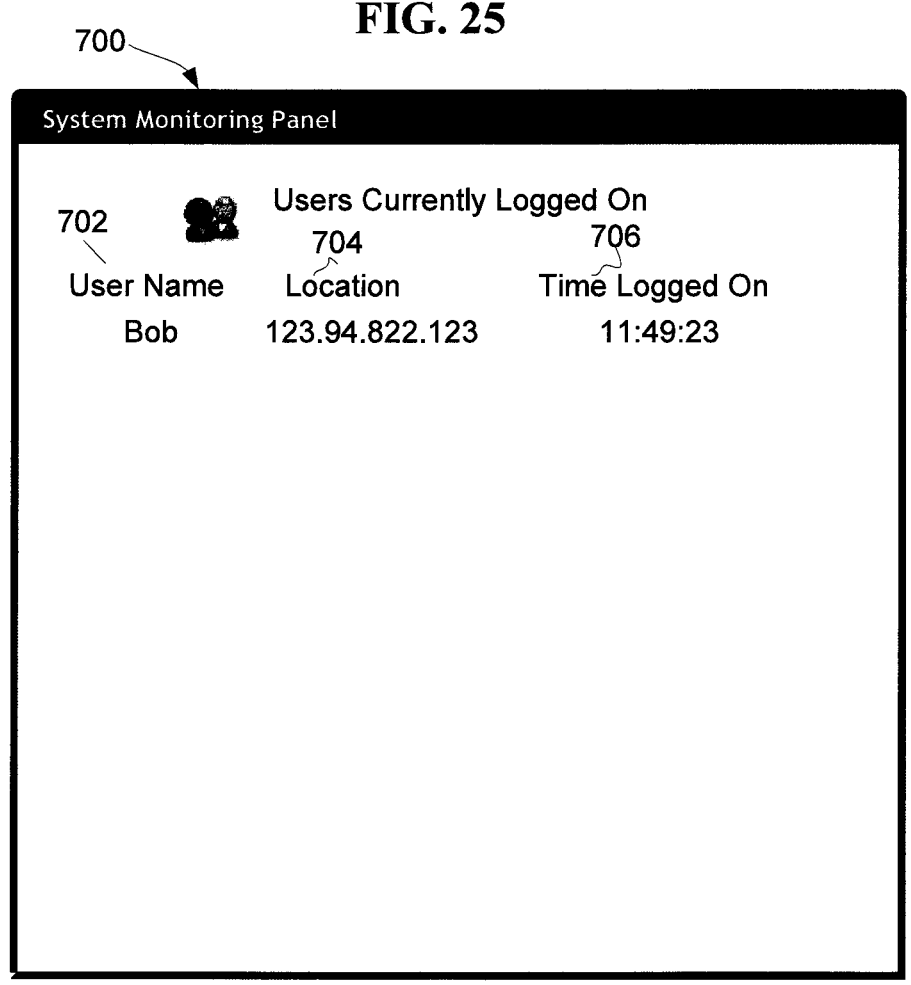
FIG. 25 is a display showing subusers currently accessing the system and their location.

Turning now to FIG. 25, the remote feature includes a display 700 indicating when a list of third-party users 702 is logged in, the locations 704 from which each user accessed the system 704, and the time 706 that each remote user logged on. The remote feature also contains a mechanism for the primary account user to revoke or change remote user passwords.

Figure 18:
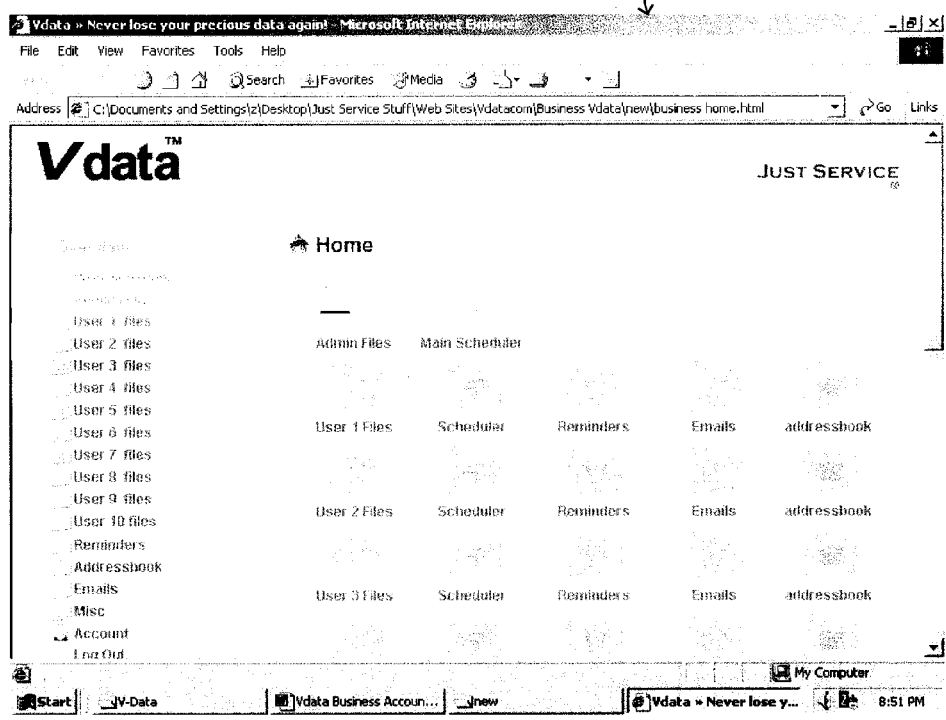
FIG. 18 is a display of an alternate multi-user embodiment of the data transfer system, showing an account administrator's screen.

FIG. 18 shows an alternate embodiment, particularly suited for business applications. In this system 240, a user account is divided into a plurality of sub-accounts. Preferably, a primary user controls the respective properties of each sub-account. The primary user, who may be a business owner or office manager rather than an IT professional, may set up the account so that the levels of access for the sub-account users may vary.

Each account may have shared files that are equally accessible to the primary user and the subaccount users, unless the access of the subaccount users has been restricted by the primary user. Similarly, each subaccount user will have personal subaccount files that are only accessible by the primary user and that subaccount user. The primary user may set different types of access (read only, save only, delete-and-change) to groups or types of files for each subaccount user. For example, a sub-account user may only be able to see his/her own files on the system computer. The sub-account user may also be limited in that he/she can only save files to the system computer but cannot access or download files from the system computer. Another user may be able to download and upload files but cannot delete any files. Another user may only be able to upload files with no other features allowed.

Figure 23:
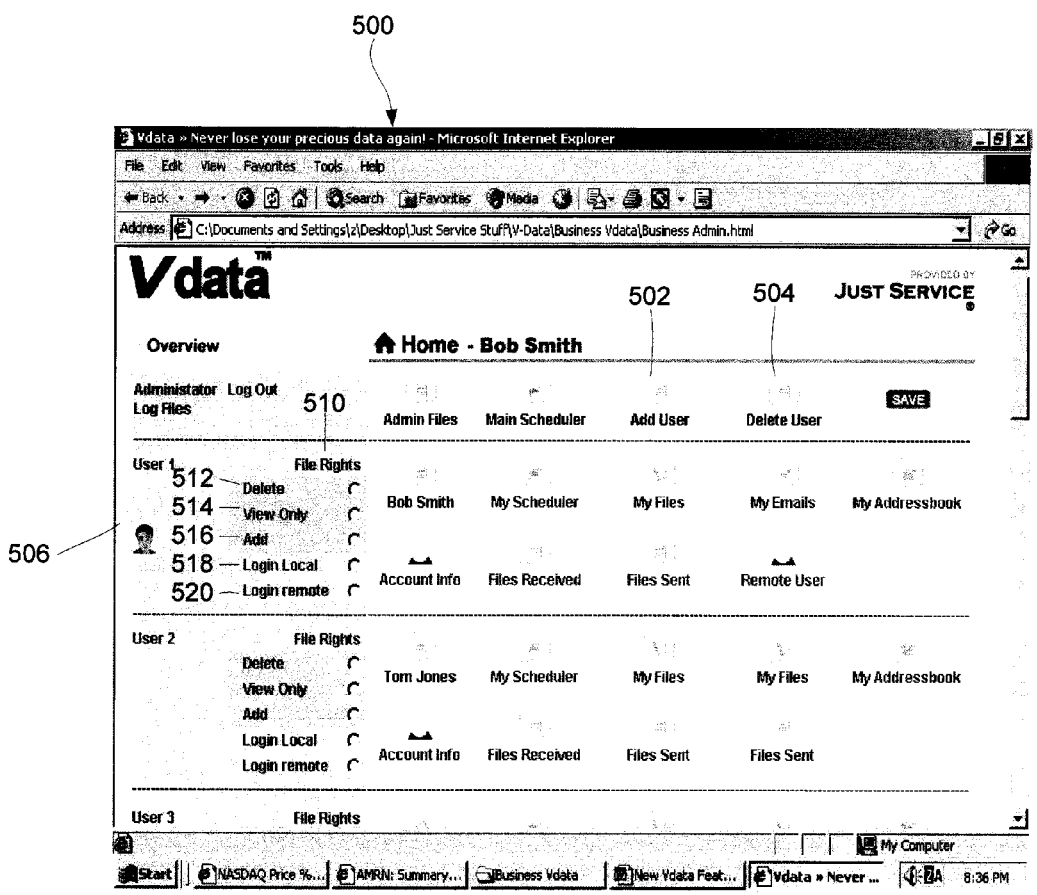
FIG. 23 is a display of an alternate multi-user embodiment of the data transfer system, showing an account administrator's screen.

FIG. 23 shows an alternate account management display 500 for a multi-user version of the system. A subuser may be added by selecting the add user routine 502, and deleted by selecting the delete user routine 504. Selecting the add user function 502, takes the user to a truncated account display similar to FIG. 4. After adding the basic account information for a subuser 506, such as the name of the subuser, the administrator grants file permissions through a single entry of an input device, such as a mouse click, on the desired features, using the file rights buttons 510. A subuser may be granted the ability to delete existing files 512, read only existing files 514 or add new files 516. A subuser may also be restricted as to where he may access the system from, as his access may be limited to certain computers 518 (as determined by IP addresses or other indicia of specific computers) or may be given unlimited access capabilities 520.

Further the user may be given access to some or all types of files. This is accomplished by using a graphic interface where a feature may be selected or deselected by a mouse click when a certain type of file rights is selected. In addition, the administrator may change the permissions associated with a subuser at any time. For example, a subuser's right to delete files can be disabled if the subuser is an employee who is about to be terminated. These functions are operated with a single click of a mouse button by a system administrator. There is no need to call a technician. All sub-account files can be accessed by the system administrator, whereas to the individual user, his access will appear similar to that of the previous embodiment shown in FIGS. 1-14. The system administrator will see an array of folders with each user having his own set of folders. However, the system administrator will also have access to a master scheduler 530 whereby he/she can create appointments or reminders that appear on the calendars 532, 534, etc. of all of the sub-account users.

Figure 19:
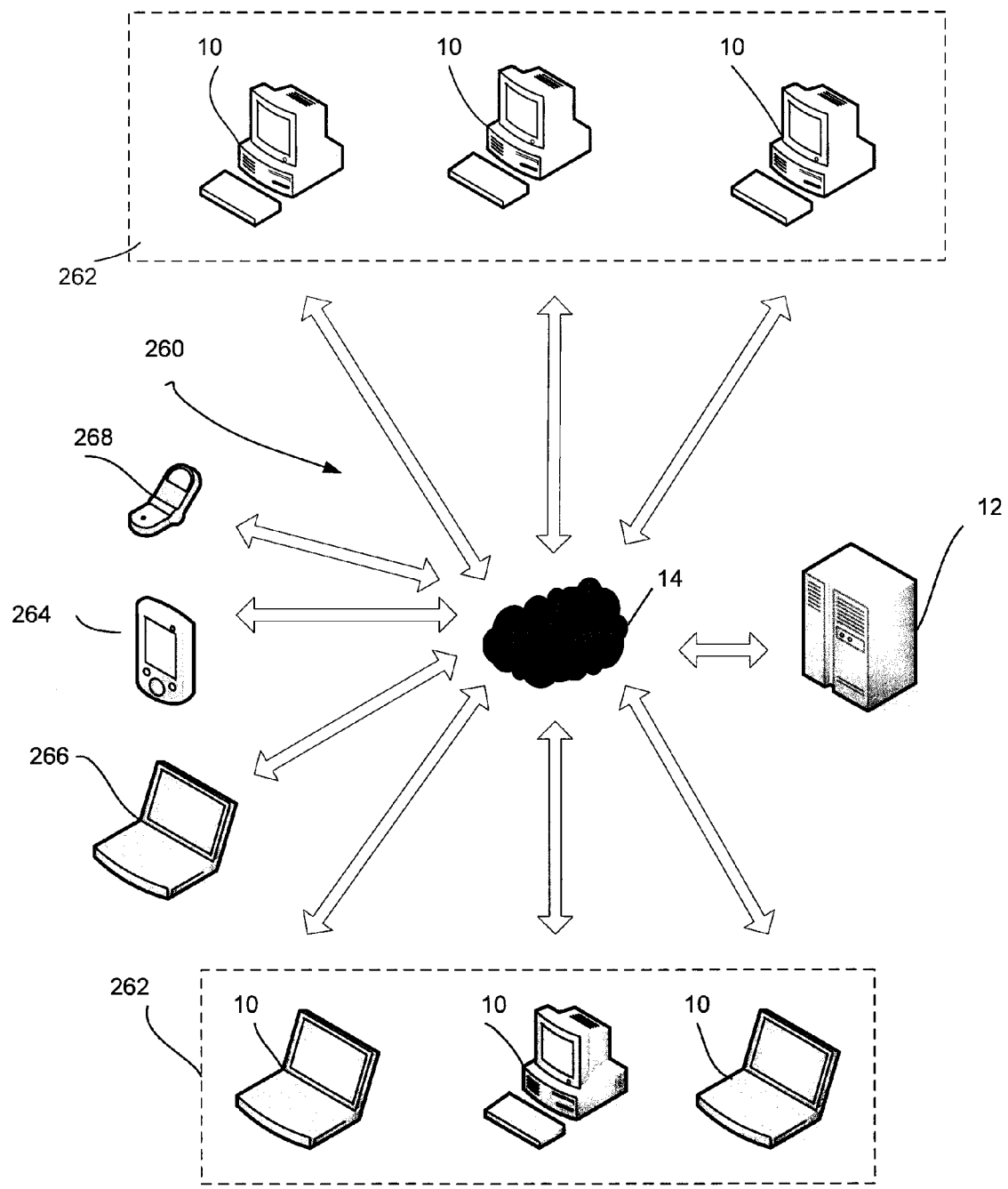
FIG. 19 is a schematic illustrating a virtual network.

FIG. 19 shows a schematic representation of a virtual server system 260 for a plural location business. The virtual server system comprises plural account user locations 262, a mobile personal data assistant 264, a mobile notebook computer 266, and a mobile telephone 268. Each location 262 has multiple computers.

The user of each computer including the mobile units 264, 266, 268 are preferably assigned a sub-account. The sub-account user computers may be linked in any manner to the Internet 14. The sub-account user computers may also have individual Internet connections. Preferably each location 262 has a high speed Internet backbone. As with previous embodiments, a system computer 12 is operatively connected to the Internet 14. In this embodiment, it is not necessary for the locations 262 to have a local file server and related hardware. The system computer 12 functions as a virtual server for all locations as well as the mobile units. Thereby, the account user business can substantially reduce computer equipment and maintenance costs. Further, if the system server is operated and maintained by a third party, as contemplated, the overall savings to the account user business can be substantial. This is of particular value to start up businesses that lack the capital to purchase and maintain a local area computer network, businesses with multiple locations, and businesses where employees are frequently away from the office, e.g., salesmen.

Figure 20:
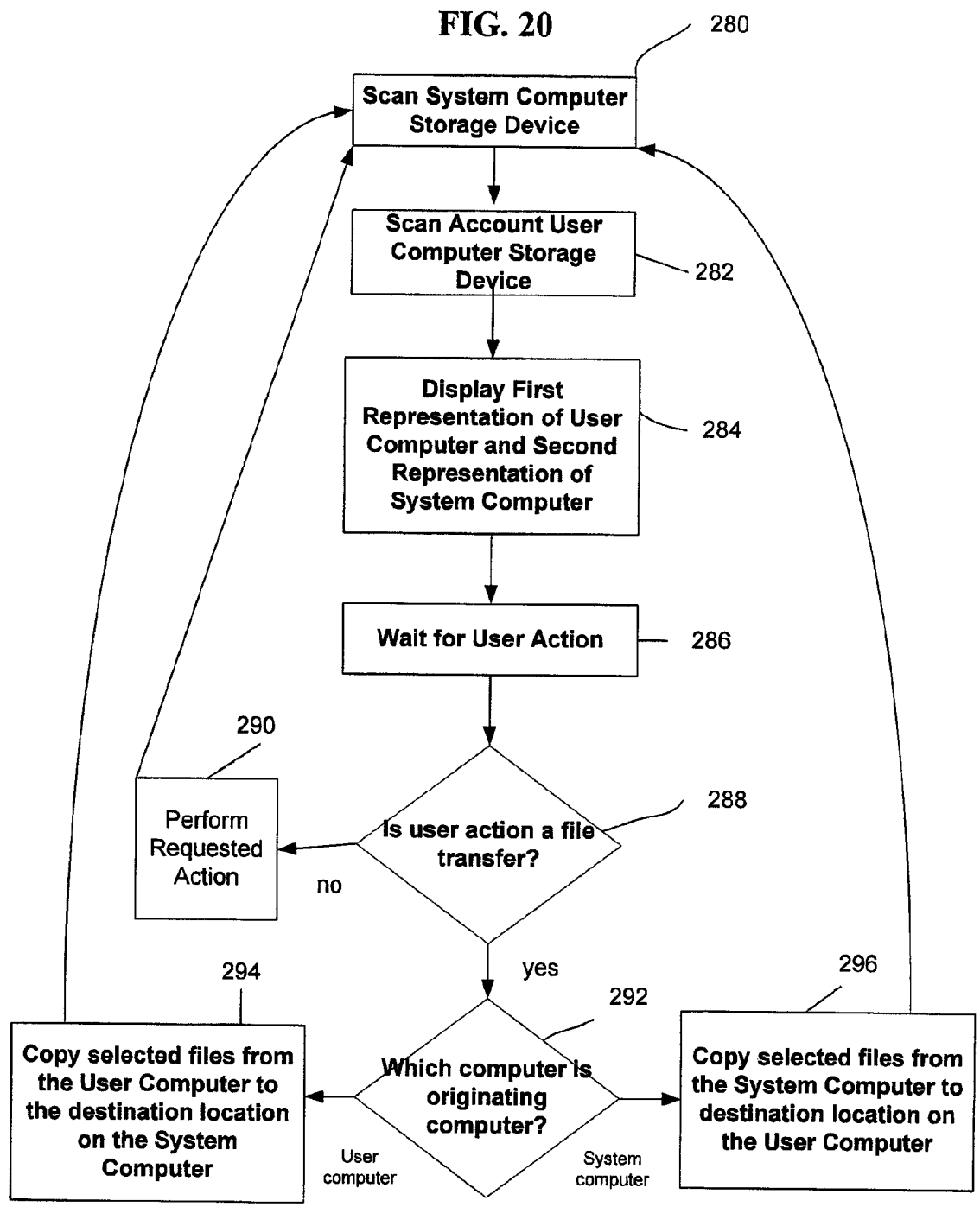
FIG. 20 is a flowchart illustrating the operation of the file transfer system shown in FIGS. 6-8.

Turning now to FIG. 20, a flow chart for method and computer program embodiments of the data storage and retrieval systems is provided. When a file transfer system option is selected, see FIG. 6, the program first scans the system computer storage device 20 at step 280 locating data files and folders associated with the account user. At step 282, the program scans the account user's computer storage device 18 at step 282. After completion of these two steps, the program displays on the account user's computer display a first representation of at least a portion of the user computer storage device 91 and a second representation of at least a portion of the data files and folders associated with the user's account of the system computer 92 (as shown in FIG. 6). The program then waits for a user action at step 284.

When the user initiates an action, for example, by pressing one of buttons 93-103, the computer evaluates which action has been requested at step 286. At step 288, the program determines whether a file transfer action has been requested (i.e., has the user pressed button 93 or 94). If the user selected a different option, the system proceeds to step 290, performs the requested action (make a new directory, delete a file, etc.) and returns to step 280.

If a file transfer option is selected, the process then proceeds to step 292, which determines which computer is the originating computer for the requested file transfer. If the user computer is the originating computer then the selected files are copied from at least one storage device 18 on the user's computer 10 to the destination location of the storage device 20 on the system computer 12 as shown at step 294. If the system computer is the originating computer then the selected files are copied from the storage device 20 on the system computer 12 to the destination location on the storage device on the account user computer 12 as shown at step 296. After either step 294 or step 296, the program cycles back to step 280.

Figure 21:
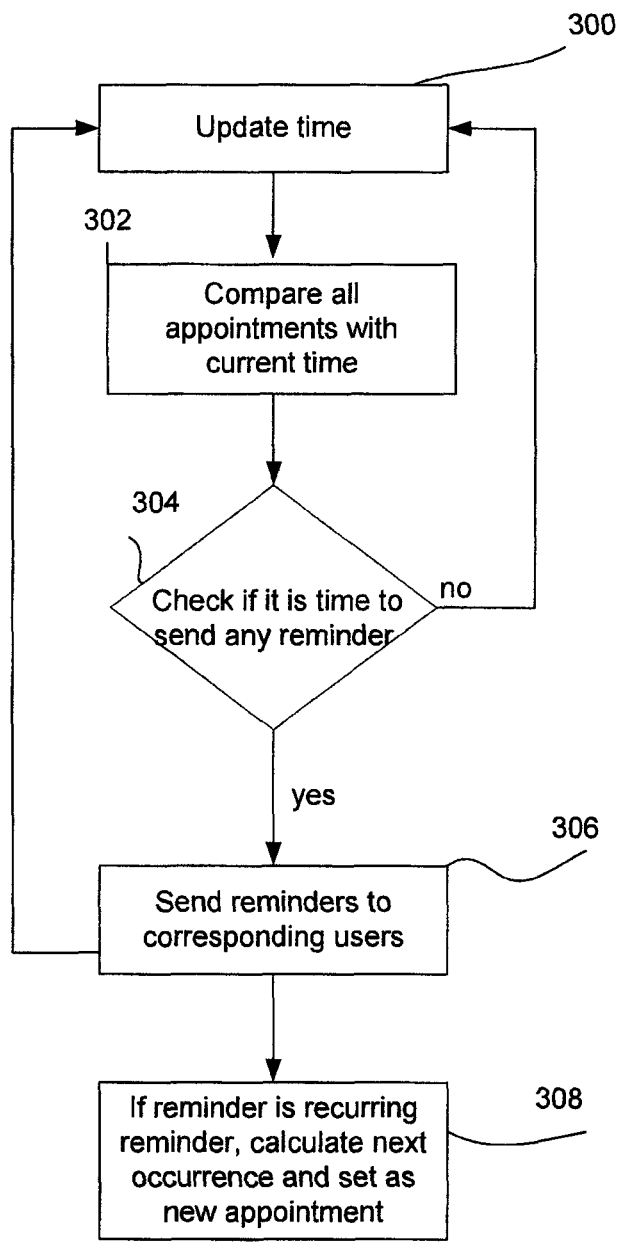
FIG. 21 is a flowchart illustrating the operation of the reminder system shown in FIGS. 10-11.

FIG. 21 shows a method of operation for a computer program embodiment of the system reminder function. At step 300, the program checks the current time as determined by a system clock incorporated into system computer 12. At step 302, the program compares all appointments with the current time. At step 304, the program determines if it is time to send any reminders by looking for matches between the current time and the times associated with appointments entered by users into the system. If there are no matches, then the system cycles back to step 300. If a match is found, the system sends and email reminder 306 to the email address stored in the account setup. The system then checks to see if the reminder was designed by the user to be a recurring reminder at step 308. If the reminder is a recurring reminder, the system then calculates the next occurrence of the appointment by adding frequency 165, and schedules a new reminder.

While a particular embodiment of the file storage and retrieval system has been described herein, it will be appreciated by those skilled in the art that changes and modifications may be made thereto without departing from the invention in its broader aspects and as set forth in the following claims.

What is claimed is:

1. A data storage system comprising:
   a system computer having a processor coupled to a memory;
   a virtual server on a network adapted to manage a plurality of user accounts, each user account including one or more user files;
   a user computer operatively connected to the network and including a display and a storage device;
   the virtual server adapted to verify user access information received from the user computer for a particular user account;
   the virtual server transferring over the network information relating to the user files stored on the virtual server in the particular user account to the user computer wherein the information is transferred directly to and displayed in a web browser;
   the virtual server being further adapted to transfer files associated with the particular user account to and from the storage device of the user computer;
   the virtual server allowing a plurality of sub-accounts to be associated with one or more of the user accounts; and
   the virtual server maintaining file rights permissions with a level of access for user accounts of the sub-accounts.

2. The data storage system of claim 1 wherein each user account has a primary account user and a plurality of subaccounts, each of the subaccounts having file rights controlled access to subaccount files stored on the system storage device and each of the subaccounts having file rights controlled access to shared account files stored on the system storage device.

3. The data storage system of claim 2 wherein the primary account user determines the file rights controlled access level for each subaccount.

4. The data storage system of claim 1 wherein the virtual server can transfer contents of user accounts to at least one auxiliary storage location.

5. The data storage system of claim 1 wherein the virtual server transfers contents of user accounts to the auxiliary storage location periodically.

6. The data storage system of claim 1 wherein the user computer can display the information and the information is a list of files stored on the virtual server in the particular user account.

7. The data storage system of claim 1 wherein the virtual server further comprises a web server and the network is the Internet.

8. The data storage system of claim 1, wherein the virtual server is further adapted to cause an icon view of system functions of the virtual server to be displayed in a browser window on the user computer.

9. The data storage system of claim 8, wherein the icon view of system functions of the virtual server to be displayed on the user computer includes at least one of a scheduler link, a contact storage link, a document transfer link and an account manager link.

10. The data storage system of claim 8, wherein the icon view of system functions of the virtual server to be displayed on the user computer includes a scheduler link, a contact storage link, a document transfer link and an account manager link.

11. A data storage system for storing data files for a plurality of accounts, comprising:
    an account user computer operatively connected to a network and including a display and a storage device; and
    a virtual server with a system storage device operatively connected to the network, the virtual server being adapted to verify account user information for each account user computer seeking to access associated account files stored on the virtual server and to display in a web browser of the account user computer a list of associated account files stored on the virtual server;
    wherein the associated personal account files stored on the virtual server system storage device can be opened and modified solely using the web browser of the account user computer;
    the virtual server allowing a plurality of sub-accounts to be associated with one or more of the accounts; and
    the virtual server maintaining file rights permissions with a level of access for accounts of the sub-accounts.

12. The data storage system of claim 11 wherein the modified file is saved to the virtual server system storage device.

13. The data storage system of claim 11 wherein the account user computer is a mobile device.

14. The data storage system of claim 11 wherein each user account has a primary account and a plurality of subaccounts, each of the subaccounts having file rights controlled access to subaccount files stored on the system storage device and each of the subaccounts having file rights controlled access to shared account files stored on the system storage device.

15. The data storage system of claim 14 wherein the file rights controlled access includes limiting subaccount access to only certain file types.

16. The data storage system of claim 14 wherein the file rights controlled access includes prohibiting the subaccount user's ability to delete files.

17. The data storage system of claim 14 wherein the subaccount is only accessible from a computer with a specified IP address.

18. A computer program product comprising computer executable instructions stored exclusively on a non-transitory computer readable medium on a virtual server comprising:
    checking for an operative connection between the virtual server and the Internet, and if the virtual server is operatively connected;
    linking the virtual server with an account user computer having a storage device after verification of an account user identification;
    identifying the contents of data files and directories of a storage device on the virtual server associated with the account user identification;
    displaying data files and directories stored on the virtual server associated with the account user identification solely using a web browser on the linked account user computer display;
    opening selected data files stored on the virtual server storage device for the verified account;
    modifying the selected data files stored on the virtual server storage device for the verified account; and
    saving the virtual server files stored on the system computer storage device for the verified account;
    the virtual server allowing a plurality of sub-accounts to be associated with one or more of the verified accounts; and the virtual server maintaining file rights permissions with a level of access for verified accounts of the sub-accounts.

\* \* \* \* \*